Sept. 8, 1964 K. E. WHITMORE ETAL 3,148,062
PHOTOGRAPHIC ELEMENTS AND PROCESSES USING SPLITTABLE COUPLERS
Filed April 6, 1959 4 Sheets-Sheet 1

KEITH E. WHITMORE
CYRIL J. STAUD
CHARLES R. BARR
JOHN WILLIAMS
INVENTORS

BY R. Frank Smith
W. H. McJowell
ATTORNEY & AGENT

Sept. 8, 1964  K. E. WHITMORE ETAL  3,148,062
PHOTOGRAPHIC ELEMENTS AND PROCESSES USING SPLITTABLE COUPLERS
Filed April 6, 1959  4 Sheets-Sheet 2

Fig. 5

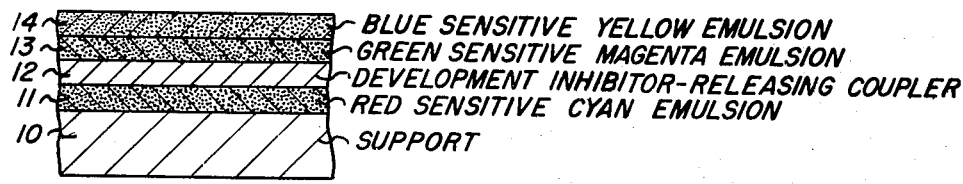

- 14 — BLUE SENSITIVE YELLOW EMULSION
- 13 — GREEN SENSITIVE MAGENTA EMULSION
- 12 — DEVELOPMENT INHIBITOR-RELEASING COUPLER
- 11 — RED SENSITIVE CYAN EMULSION
- 10 — SUPPORT

Fig. 6

- 12 — EMULSION + DEVELOPMENT INHIBITOR-RELEASING COUPLER
- 11 — FOGGED EMULSION + SOLUBLE DYE-FORMING COUPLER
- 10 — SUPPORT

Fig. 7

- 13 — GREEN SENSITIVE EMULSION + MAGENTA COUPLER
- 12 — RED SENSITIVE EMULSION + CYAN DEVELOPMENT INHIBITOR-RELEASING COUPLER
- 11 — GREEN SENSITIVE EMULSION + YELLOW COUPLER
- 10 — SUPPORT

Fig. 8

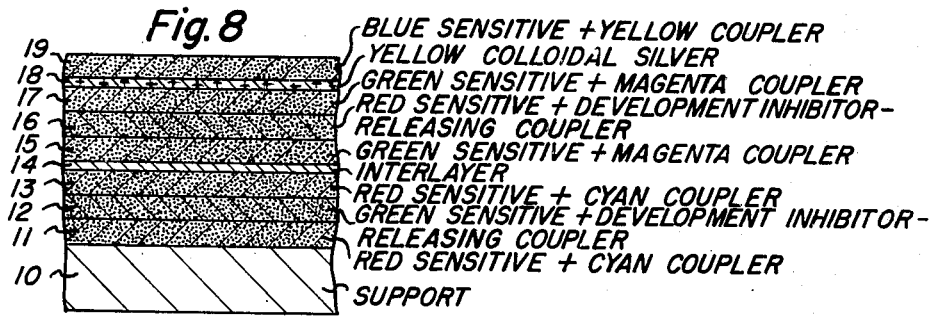

- 19 — BLUE SENSITIVE + YELLOW COUPLER
- 18 — YELLOW COLLOIDAL SILVER
- 17 — GREEN SENSITIVE + MAGENTA COUPLER
- 16 — RED SENSITIVE + DEVELOPMENT INHIBITOR-RELEASING COUPLER
- 15 — GREEN SENSITIVE + MAGENTA COUPLER
- 14 — INTERLAYER
- 13 — RED SENSITIVE + CYAN COUPLER
- 12 — GREEN SENSITIVE + DEVELOPMENT INHIBITOR-RELEASING COUPLER
- 11 — RED SENSITIVE + CYAN COUPLER
- 10 — SUPPORT

KEITH E. WHITMORE
CYRIL J. STAUD
CHARLES R. BARR
JOHN WILLIAMS
INVENTORS

BY R. Frank Smith
W. H. McDowell
ATTORNEY & AGENT

Sept. 8, 1964     K. E. WHITMORE ETAL     3,148,062
PHOTOGRAPHIC ELEMENTS AND PROCESSES USING SPLITTABLE COUPLERS
Filed April 6, 1959     4 Sheets-Sheet 3
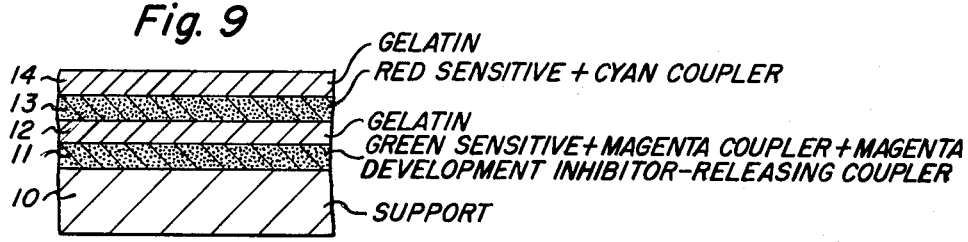
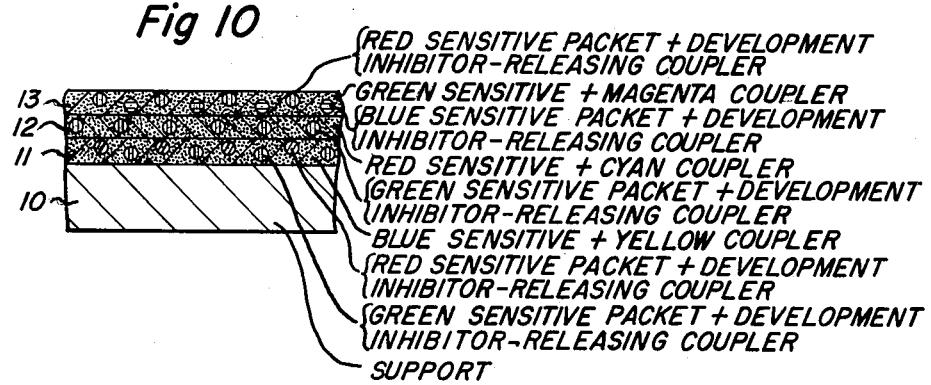
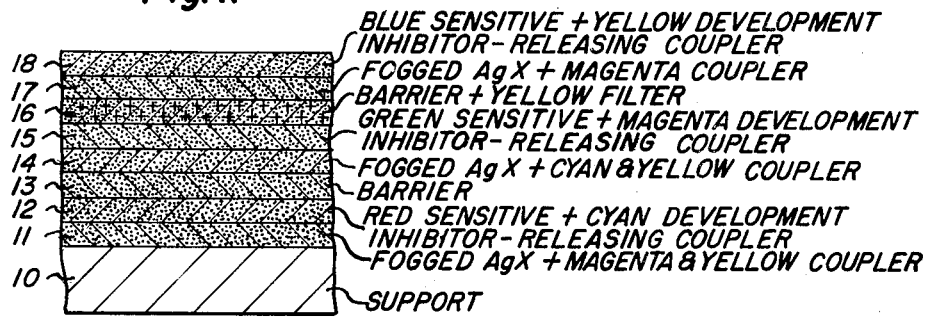
KEITH E. WHITMORE
CYRIL J. STAUD
CHARLES R. BARR
JOHN WILLIAMS
INVENTORS
ATTORNEY & AGENT

United States Patent Office 3,148,062
Patented Sept. 8, 1964

3,148,062
PHOTOGRAPHIC ELEMENTS AND PROCESSES USING SPLITTABLE COUPLERS
Keith E. Whitmore, Cyril J. Staud, Charles R. Barr, and John Williams, all of Rochester, N.Y., assignors to Eastman Kodak Company, Rochester, N.Y., a corporation of New Jersey
Filed Apr. 6, 1959, Ser. No. 804,219
16 Claims. (Cl. 96—55)

This invention relates to photographic processes in which light-sensitive photographic elements are developed in the presence of certain development-inhibitor-releasing coupler (hereinafter referred to in this application as DIR coupler) compounds which react with the oxidation product of the developing agent to yield development-inhibiting substances or substances which become development-inhibiting substances, having the property of controlling the development of the emulsion or emulsions of the photographic elements with which the coupler is associated.

The sensitive elements of the invention include the combination of at least one silver halide emulsion and a DIR coupler. The coupler is disposed contiguous to the emulsion, that is, it is present either in the emulsion layer or adjacent thereto as in a separate layer. In one form of the invention the coupler is incorporated into the emulsion in order to control the speed and contrast of the emulsion. In another form of the invention the DIR coupler is associated with the emulsion together with at least one other coupler of the well-known nondiffusing image-forming type. During development of the emulsion, the formation of the silver image, and subsequently of the dye image, is controlled by the development-inhibiting substance split off of the DIR coupler. Additional sensitive elements include several superposed emulsions sensitive to different regions of the spectrum and each containing nondiffusing image-forming couplers and having one of the DIR couplers of the invention contiguous to one or more of the emulsion layers. Thus, the DIR coupler may be contained in one emulsion layer and during development the development-inhibiting substance produced diffuses to an adjacent emulsion layer to control the production of the dye image therein. In multilayer color films the DIR coupler may be positioned in an interlayer between a pair of the emulsions so that the development-inhibiting substance formed during development may diffuse to both emulsion layers and mutually control the formation of dye images in both layers.

The processes of the invention are applicable to the development of silver halide emulsions for black-and-white or color photography in the presence of the DIR coupler compounds of the invention. For this purpose, the DIR coupler compounds may be present in the developer composition with the result that the development of one or more emulsion layers is controlled by the development-inhibiting substance released by reaction of the coupler with the oxidation product of the developing agent. If such development is carried out in the presence of nondiffusing image-forming coupler compounds, the development-inhibiting substance is effective in controlling the formation of the nondiffusing dye images.

The DIR coupler compounds of the invention include well-known coupler compounds such as phenolic, naph-tholic, 5-pyrazolone and open-chain reactive methylene-compounds containing the group X—CH$_2$—Y wherein X and Y are groups activating the methylene group, as present in couplers containing the group

—CO—CH$_2$—CO— to the coupling position of which couplers is linked moiety capable of being split off by reaction of the coupler with the oxidation product of the developing agent to release a diffusible development-inhibiting substance which controls development of the emulsion intimately associated with the coupler or the development of an adjacent emulsion or the development of both emulsions. In one form of DIR coupler the dye itself formed by reaction of the coupler with the oxidized developing agent comprises the development-inhibiting substance. Other DIR couplers contain a preformed development-inhibiting moiety such as a tetrazole or triazole group. Similarly, organic radicals may be joined to the coupling position of the coupler molecule by a —S— linkage which is broken during development to yield mercapto compounds functioning as development-inhibiting substances.

An additional type of DIR coupler constituting an illustrative embodiment of the invention contains in the coupling position a chain of atoms which, during reaction of the coupler with the oxidized developer, cyclizes to form a development-inhibiting substance.

The development-inhibiting moieties of the coupler compounds thus include groups of atoms suitably linked to the coupling position of the couplers so as to yield development-inhibiting substances during the development of photographic emulsions with primary aromatic amino silver halide developing agents. As will be seen from the following examples, these moieties include triazolyl, tetrazolyl, thiazolyl, mercaptotetrazolyl, etc., radicals linked to the couplers in the coupling position by azo linkages; o-amino and o-amido monocyclic aryl azo radicals and o-amino and o-amido monocyclic aryl azoxy, and triazolyloxy radicals, as well as monocyclic arylthio, alkylthio and heterocyclicthio radicals linked to the couplers in the coupling position such as alkylthio, phenylthio, naphthylthio, substituted alkylthio, phenylthio, and naphthylthio; thiazolylthio, and tetrazolylthio radicals.

An effective group of DIR couplers of the invention include compounds which are reactive with the oxidation product of primary aromatic amino silver halide developing agents to form dyes and which have one of the following groups linked directly to the coupling position of the coupler molecule:

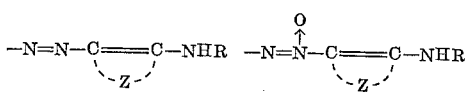

and

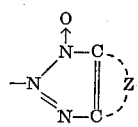

wherein Z represents the atoms necessary to complete a cyclic group such as a cycloalkane group or an aryl group of the benzene or naphthalene series, substituted or not with atoms or radicals, e.g., halogen, alkyl, alkoxy, etc., and R represents a hydrogen atom or an aliphatic acyl group such as acetyl, butyryl, palmitoyl, etc. The mentioned coupling position of the couplers of course refers to the nuclear position of the coupler compound at which the oxidized color developing agent reacts to form a dye which in the case of the phenolic and 5-pyrazolone couplers, is the 4-position and the methylene group of the open-chain coupler compounds containing the group —X—CH$_2$—Y—, e.g., —CO—CH$_2$—CO—.

The DIR coupler compounds of this invention are divided into two classes, i.e., non-preformed development-inhibitor-releasing coupler compounds and preformed development-inhibitor-releasing coupler compounds.

By non-preformed development - inhibitor - releasing coupler compounds, is meant either diffusible or nondiffusible coupler compounds containing in a coupling position of the coupler molecule a moiety such as an ortho-aminophenylazo moiety, or a phenylthio moiety, incapable of imparting development-inhibiting properties to the coupler per se, said coupler upon reaction with the oxidation product of a primary aromatic amino silver halide developing agent, forming a dye and a diffusible development-inhibiting compound containing the atoms of the moiety.

By preformed nondiffusible development-inhibitor-releasing coupler compounds, is meant substantially nondiffusible coupler compounds containing in either a coupling or a noncoupling position of the coupler molecule a moiety, such as a benzotriazolyl moiety, imparting development-inhibiting properties to the coupler per se, said coupler upon reaction with the oxidation product of a primary aromatic amino silver halide developing agent, forming a dye and a diffusible development-inhibiting compound containing the atoms of the moiety.

The DIR couplers included in this application are classified as follows:

CLASS I.—NON-PREFORMED DIR COUPLERS

This class includes coupler compounds, to the coupling position of which is linked a moiety such as an o-aminophenylazo group or phenylthio group, which are capable of reaction with the oxidation product of a primary aromatic amino silver halide developing agent to yield a dye and a development-inhibiting substance such as a benzotriazole or a thiophenol. The moiety in the coupling position is not capable of inhibiting development before coupling because the inhibiting group is either masked or not yet formed.

Type A.—Colored Non-Preformed DIR Couplers

This type includes colored (e.g., azo) coupler compounds of Class I and are divided into the following sub-types.

(1) This sub-type includes nondiffusible coupler compounds of Type A which yield nondiffusible dyes and diffusible development inhibitors.

(2) This sub-type includes nondiffusible coupler compounds of Type A which yield diffusible dyes and diffusible development inhibitors.

(3) This sub-type includes diffusible coupler compounds of Type A which yield non-diffusible dyes and diffusible development inhibitors.

(4) This sub-type includes diffusible coupler compounds of Type A which yield diffusible dyes and diffusible development inhibitors.

Type B.—Colorless Non-Preformed DIR Couplers

This type includes colorless (e.g., benzotriazolyloxy, phenylazoxy, phenylthio) coupler compounds of Class I and are divided into the following sub-types.

(1) This sub-type includes nondiffusible coupler compounds of Type B which yield nondiffusible dyes and diffusible development inhibitors.

(2) This sub-type includes diffusible coupler compounds of Type B which yield nondiffusible dyes and diffusible development inhibitors.

(3) This sub-type includes diffusible coupler compounds of Type B which yield diffusible dyes and diffusible development inhibitors.

CLASS II.—PREFORMED DIR COUPLERS

This class includes nondiffusible coupler compounds which are capable of reaction with the oxidation product of a primary aromatic amino silver halide development agent to yield diffusible development inhibitors. These coupler compounds contain, either in a coupling off or other position, a moiety which is capable of inhibiting development before the coupling reaction takes place. However, on coupling the development-inhibiting moiety becomes diffusible and consequently an effective inhibitor.

Type C.—Colored Preformed DIR Couplers

This type includes colored (e.g., azo) coupler compounds of Class II, to the coupling position of which is linked a preformed development-inhibiting moiety such as a benzotriazolyl azo group, which are capable of reaction with the oxidation product of a primary aromatic amino silver halide developing agent to yield a nondiffusible dye and diffusible development inhibitor such as benzotriazole.

Type D.—Colorless Preformed DIR Couplers

This type includes colorless (e.g., ether) coupler compounds of Class II, to the coupling position of which is linked a preformed development-inhibiting moiety such as a benzotriazolyl ethoxy group, which are capable of reaction with the oxidation product of a primary aromatic amino silver halide developing agent to yield a nondiffusible dye and a diffusible development inhibitor such as a hydroxyethylbenzotriazole.

Type E.—Colored Preformed DIR Couplers

This type includes colored (e.g., azo) coupler compounds of Class II to which is linked in the coupling position a ballasted coupling off group such as a ballasted phenylazo group. These coupler compounds are capable of reaction with the oxidation product of a primary aromatic amino silver halide developing agent to yield a diffusible development inhibiting dye and an innocuous coupled off ballast group.

Type F.—Colorless Preformed DIR Couplers

This type includes colorless (e.g., arylidene) coupler compounds of Class II to which is linked in a non-coupling position a preformed development-inhibitor moiety such as a benzotriazolyl group or a thiourea group, and in the coupling position a ballasted coupling off group such as an alkoxybenzylidene group. These coupler compounds are capable of reaction with the oxidation product of a primary aromatic amino silver halide developing agent to yield a diffusible development-inhibiting dye and an innocuous coupled off ballast group.

The following are representative DIR couplers conforming to the above classification.

CLASS I-A-1

Nondiffusible Colored DIR Couplers Which Yield Non-Diffusible Dyes and Diffusible Development Inhibitors 1-hydroxy-4-(2-amino-4-methylphenylazo)-N-[δ-(2-4-di tertamylphenoxy)butyl]-2-naphthamide (I) 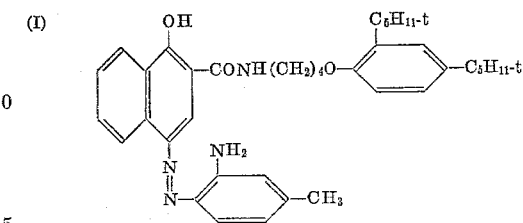

1-hydroxy-4-(2-acetamidophenylazo)-N-[δ-(2,4-di-tert-amylphenoxy)butyl]-2-naphthamide (II)

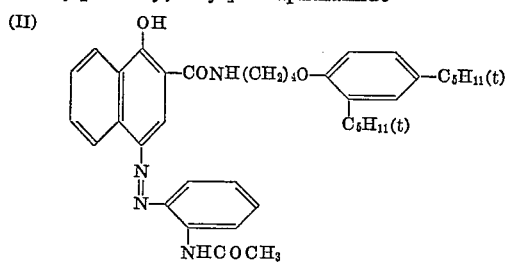

1-hydroxy-4-(2-aminophenylazo)-N-[δ-(2,4-di-tert-amylphenoxy)-butyl]-2-naphthamide (III)

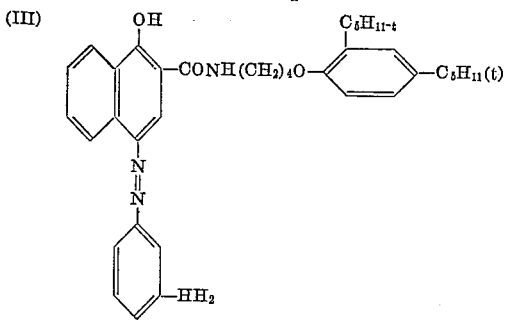

1-[4-(4-tert-butylphenoxy)-phenyl]-3-[α-(4-tert-butyl-phenoxy)-propionamido]-4-(2-amino-4-methoxyphenylazo)-5-prazolone (IV)

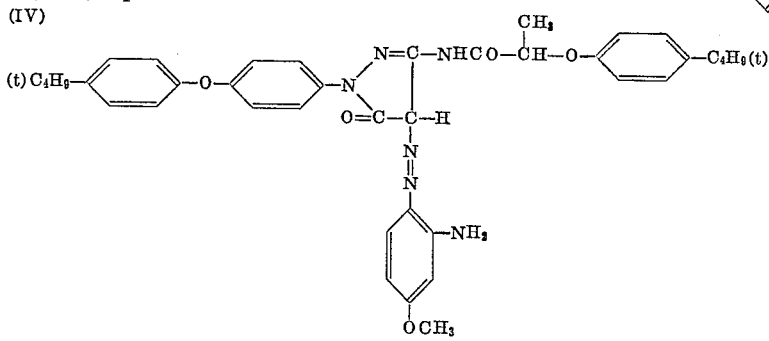

1-(2,4,6-trichlorophenyl)-3-{3-[α-(2,4-di-tert-amylphenoxy)acetamido]-benzamido}-4-(2-amino-4-methoxyphenylazo)-5-pyrazolone (V)

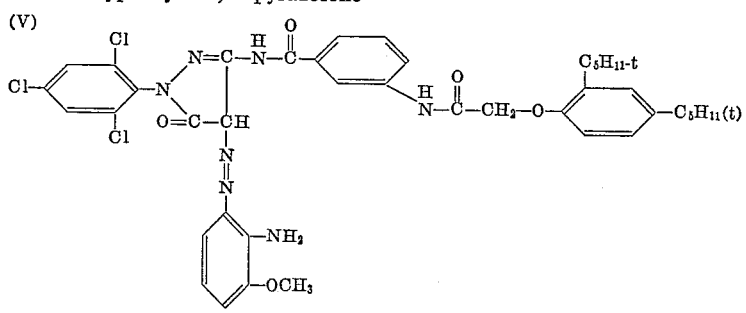

1-hydroxy-4-(2-amino-4-chlorophenylazo)-N-[δ-(2,4-ditert-amylphenoxy)butyl]-2-naphthamide (VI)

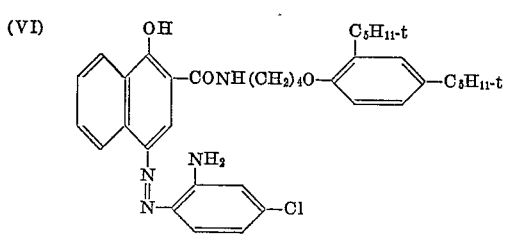

α-Benzoyl-α-(2-aminophenylazo)-4-[N-(p-tolyl)-N-(γ-phenylpropyl)sulfamyl]acetanilide (VIa)

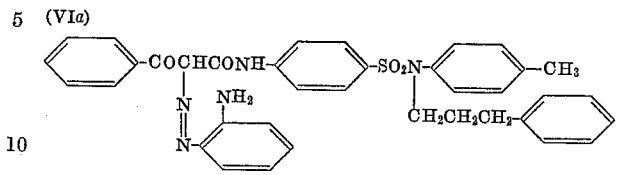

1-hydroxy-4-(2-palmitamidophenylazo)-N-[δ-(2,4-di-tert-amylphenoxy)butyl]-2-naphthamide (VII)

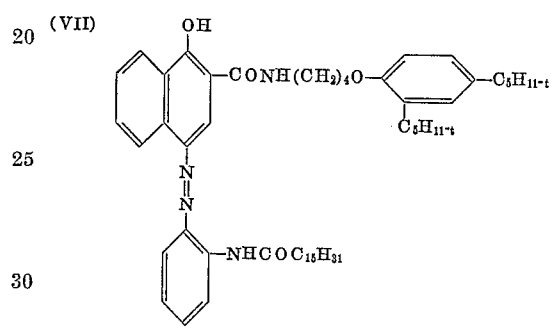

1-hydroxy-4-(2-acetamidophenylazo)-N-octadecyl-3',5'-dicarboxy-2-naphthanilide (VIII)

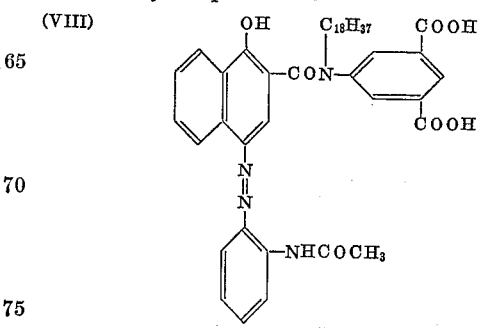

CLASS I-A-2

*Nondiffusible Colored DIR Couplers Which Yield Diffusible Dyes and Diffusible Development Inhibitors*

1-hydroxy-4-(4-methoxy-2-palmitamidophenylazo)-N-(β-sulfoethyl)-2-naphthamide sodium salt (IX)
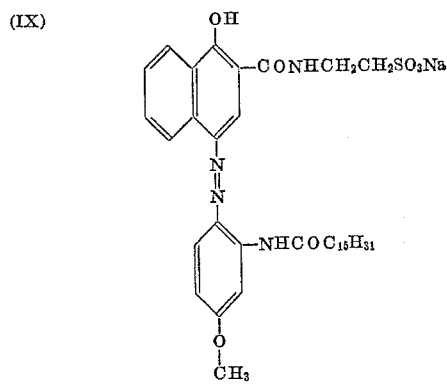

The reaction of a typical Class I-A-2 coupler with an oxidized developing agent, N,N-diethyl-β-methyl-4-aminoaniline proceeds as follows:

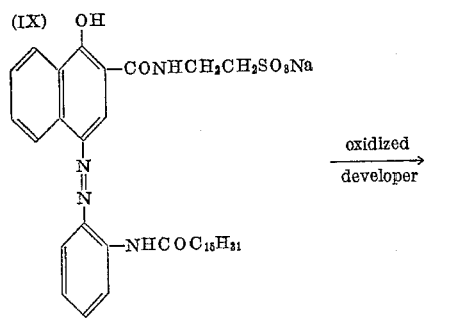

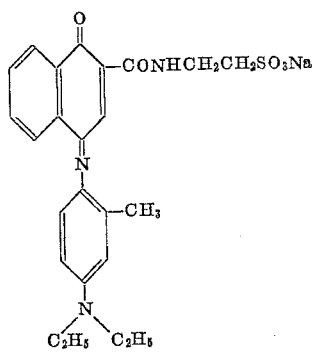

Diffusible dye

+

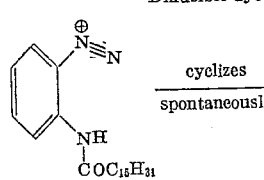 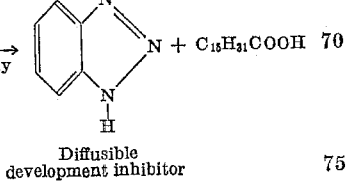

Diffusible development inhibitor

CLASS I-A-3

*Diffusible Colored DIR Couplers Which Yield Non-Diffusible Dyes and Diffusible Development Inhibitors*

1-hydroxy-4-[2-(β-sulfopropionamido)phenylazo]-N-ethyl-2-naphthamide sodium salt (IXa)
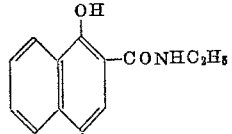

CLASS I-A-4

*Diffusible Colored DIR Couplers Which Yield Diffusible Dyes and Diffusible Development Inhibitors*

1-hydroxy-4-(2-acetamido-4-methoxy)-N-(β-sulfoethyl)-2-naphthamide sodium salt (X)
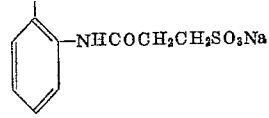

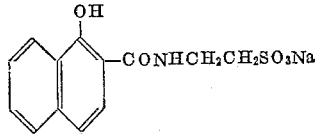

1-hydroxy-4-(2-aminophenylazo)-N-(β-sulfoethyl)-2-naphthamide sodium salt (XI)
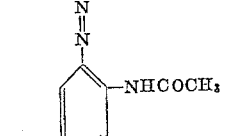

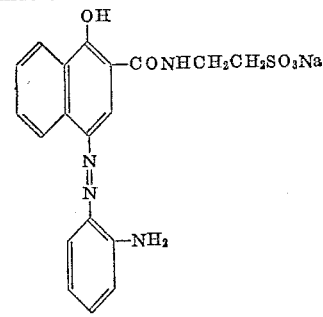

1-hydroxy-4-(2-amino-4-methoxyphenylazo)-N-(β-sulfoethyl)-2-naphthamide sodium salt (XII)
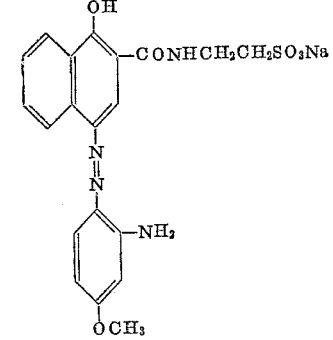

The unusual properties of this class (I-A) of DIR couplers are derived from the presence in the coupling position of the molecule, of a cyclic substituent having an amino or amido group in a position ortho to the azo linkage, or in the case of polynuclear substituents in the ortho or peripositions, with the result that during color development of emulsions with which the couplers are associated, the coupler moiety forms a dye with the oxidized developer and the cyclic aminoazo or amidoazo moieties split off and cyclize to form triazoles which function as development inhibitors which diffuse imagewise to adjacent emulsions. These DIR couplers are unique in comparison with couplers such as XLI–XLVIII below having preformed inhibitor moieties, since the latter exhibit a tendency to alter sensitometric emulsion characteristics such as speed, gamma and fog. Compounds such as 4-(p-hydroxyphenylazo)benzotriazole, while being preformed development-inhibitor-releasing coupler compounds are diffusible and in themselves inhibit silver halide development. The compounds of our invention which are diffusible are initially non-development inhibiting. Since these Class I Type A couplers, e.g., I to XII, only form the development-inhibiting compound during color development and at the site of the developed silver halide, emulsions containing them are not adversely affected even after storage for extended periods of time. The reaction of a typical Class I–A–1 type coupler with an oxidized developing agent, N,N-diethyl-3-methyl-4-aminoaniline, proceeds as follows:

(V)

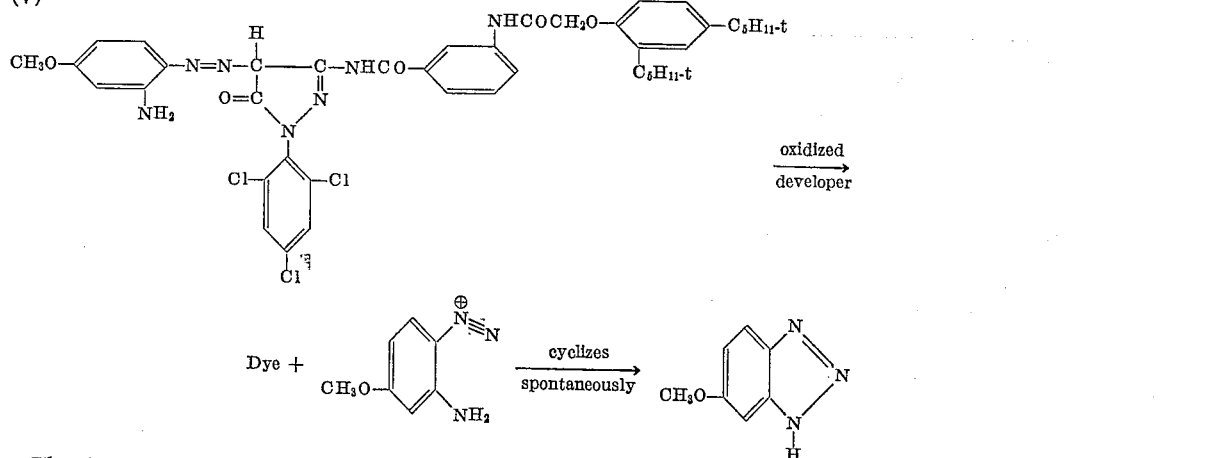

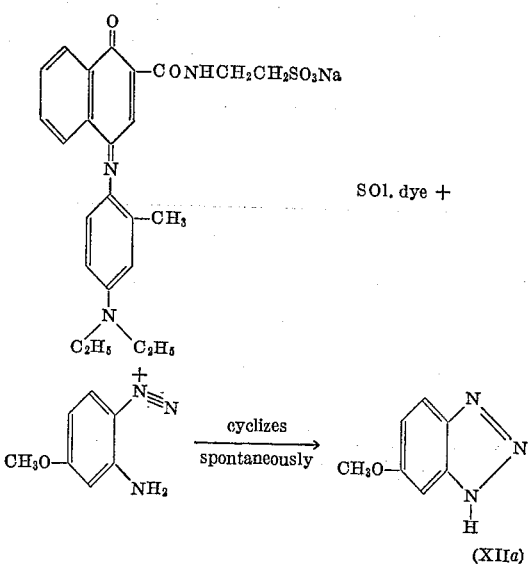

The above couplers have the following general formula:

Cp—Y—R wherein Y is an azo linkage, Cp is a coupler moiety forming a dye with oxidized color developer, and R represents a cyclic group such as an aryl group of the benzene or naphthalene series, the aromatic nucleus of which is connected directly to the azo group and contains an amino or amido group in the ortho position. Couplers of this class react with oxidized color developing agent to split off a diazonium ion which subsequently cyclizes to yield a triazole as the development-inhibiting compound for the processes, as shown in the above equation.

The following reaction proves that this type of cyclization does take place:

Reaction of 1-hydroxy-4-(2-amino-4-methoxyphenylazo)-N-(β-sulfoethyl)-2-naphthamide with oxidized 4-amino-3-methyl-N,N-diethylaniline (XII)

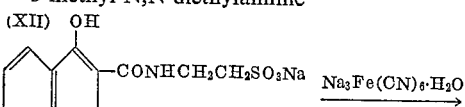

XIIa was isolated and its properties were found to be identical to those found in the literature for 5-methoxybenzotriazole as follows: M.P. of XIIa—125.5°–126.5° C.

| Analysis | Calculated from XIIa | Found |
|---|---|---|
| C | 56.3 | 56.3 |
| H | 4.7 | 4.7 |
| N | 28.2 | 28.3 |
| O | 10.7 | |

The following melting points for 5-methoxybenzotriazole were found:

(1) J.A.C.S. 75, 715–18—M.P.=126.8°–127.2°.
(2) J. Gen. Chem. 18, 1699 (1948), C.A. 43, 2618 (1949)—M.P.=124°–126°.

An infrared curve of XIIa is identical to the infrared curve given for 5-methoxybenzotriazole.

(1) J.A.C.S. 75, 715.

CLASS I–B–1a

*Nondiffusible Colorless DIR Couplers Which Yield Nondiffusible Dyes and Diffusible Development Inhibitors*

The following are representative of the DIR couplers having cyclic amino azoxy or triazolyloxy substituents in the coupling position.

1 - hydroxy - 4 - (2 - amino - 4 - methylphenylazoxy - N-
[δ-(2,4-di-tert-amylphenoxy)butyl]-2-naphthamide
(XIII)

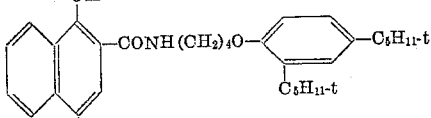

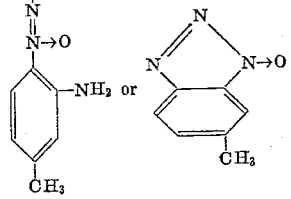

1 - hydroxy - 4 - (2 - aminophenylazoxy) - N - [δ - (2,4-di-tert-amylphenoxy)butyl]-2-naphthamide
(XIV)

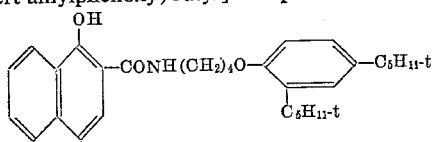

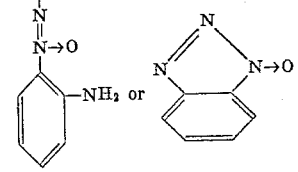

These couplers derive their properties from the presence in the coupling position, of a cyclic substituent probably having an amino or amido group in a position ortho to the azoxy linkage, or in the case of polynuclear substituents in the ortho position, such that during the development of emulsions with which the couplers are associated, the coupler moiety forms a dye with the oxidized developing agent and the cyclic aminoazoxy or amidoazoxy moieties split off and cyclize to form hydroxy triazoles which function as development inhibitors. Since these couplers are generally colorless compounds, they may be used with advantage in the processes of the invention.

The reaction of this type of coupler with an oxidized developer N,N-diethyl-3-methyl-4-aminoaniline may proceed as follows:
(XIV)

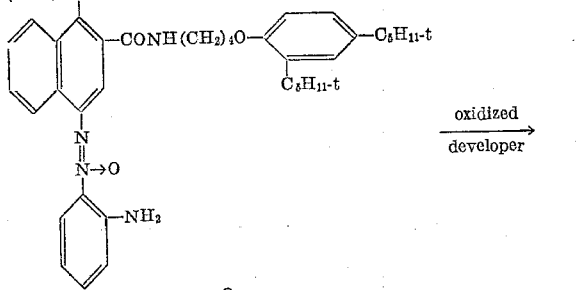

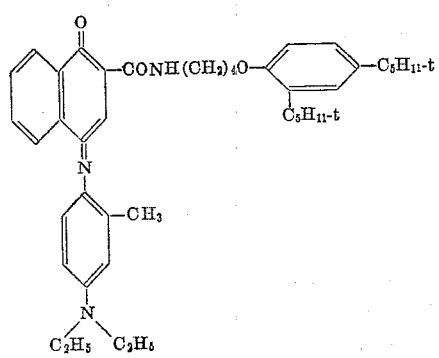

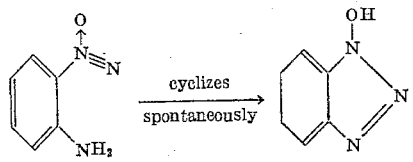

As indicated above, it is not known with certainty whether the development inhibiting moiety of these couplers XIII and XIV have the aminoazoxy benzene structure or the benzotriazolyloxy structure shown. Accordingly, in the reaction just above it is quite possible that the triazolyloxy moiety is formed during synthesis of the compounds rather than being cyclized during the development reaction, and is split off as such by reaction with the oxidized developer. Thus the couplers have the following probable general formula Cp—Y—R wherein Y is the azoxy linkage

Cp is a coupler moiety forming a dye with oxidized developer, and R is an aryl group of the benzene or naphthalene series, the aromatic nucleus of which is attached directly to the azoxy linkage and contains an amino or amido group in the ortho position. Otherwise Y and R together comprise the mentioned triazolyloxy moiety. Couplers of this class are believed to split off a hydroxy triazolyl ion functioning as a development inhibitor in the processes of the invention.

It is to be considered that our invention as claimed contemplates the couplers containing either the o-aminoazoxy or the triazolyloxy moieties.

Additional coupler compounds useful in the invention and having "non-preformed" development-inhibiting moieties linked in the coupling position are as follows:

CLASS I-B-1b

*Nondiffusible Colorless DIR Couplers Which Yield Nondiffusible Dyes and Diffusible Development Inhibitors*

The following are representative of the coupler compounds having organic moieties linked to the coupling position by the —S— linkage and which couplers react with oxidized color developing agents in the processes of the invention to split off mercapto compounds which function as development inhibitors.

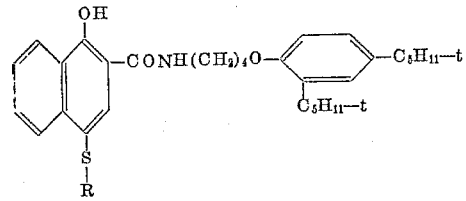

wherein R is as indicated below in the following specific compounds.

R=phenyl:
 (XV) 1 - hydroxy - 4 - phenylthio - N - [δ - (2,4-di-tert-amylphenoxy)butyl]-2-naphthamide
R=2-nitrophenyl or 4-nitrophenyl:
 (XVI) (XVII) 1-hydroxy-4-(2- or 4-nitrophenylthio) - N - [δ-(2-4-di-tert-amylphenoxy)butyl]-2-naphthamide
R=2-aminophenyl or 4-aminophenyl:
 (XVIII) (XIX) 1-hydroxy-4-(2- or 4-aminophenylthio) - N - [δ - (2,4 - di - tert - amylphenoxy)butyl]-2-naphthamide R=alkyl, e.g., hexyl:
  (XX) 1 - hydroxy - 4 - hexylthio - N - [δ - (2,4 - di-tert-amylphenoxy)butyl]-2-naphthamide
R=4-acylamidophenyl, e.g., 4-acetamidophenyl:
  (XXI) 1 - hydroxy - 4 - (4 - acetamidophenylthio) - N - [δ - (2,4 - di - tert - amylphenoxy)butyl]-2-naphthamide
R=2-benzothiazolyl:
  (XXII) 1 - hydroxy - 4 - (2 - benzothiazolylthio) - N - [δ - (2,4 - di - tert - amylphenoxy)butyl] - 2-naphthamide
R=2-diethylcarbamylphenyl:
  (XXIII) 1 - hydroxy - 4 - [2 - (N,N - diethylcarbamyl)phenylthio] - N - [δ - (2,4 - di - tert - amylphenoxy)butyl]-2-naphthamide
R=2,4-dinitrophenyl:
  (XXIV) 1 - hydroxy - 4 - (2,4 - dinitrophenylthio)-N - [δ - (2,4 - di - tert - amylphenoxy)butyl] - 2-naphthamide R=alkylsulfonamidophenyl, e.g., 4-methylsulfonamidophenyl:
  (XXV) (XXVa) 1 - hydroxy - 4 - (2 - or 4 - methylsulfonamidophenylthio) - N - [δ - (2,4 - di - tert-amylphenoxy)butyl]-2-naphthamide
R=tetrazolyl, e.g., 1-phenyl-5-tetrazolyl:
  (XXVI) 1 - hydroxy - 4 - (1 - phenyl - 5 - tetrazolylthio) - N - [δ - (2,4 - di - tert - amylphenoxy)butyl]-2-naphthamide Additional examples of this type of coupler are:

1 - hydroxy - 4 - (2 - benzothiazolylthio) - N - (3,5 - dicarboxyphenyl)-N-octadecyl-2-naphthamide (XXVII)

2 - (3,5 - dichlorosulfonyl - N - octadecylbenzamido)-5-methyl-4-(4-nitrophenylthio)phenol (XXVIII)

1 - hydroxy - 4 - (o - nitrophenylthio) - N - octadecyl-3',5'-dicarboxy-2-naphthanilide (XXIX)

R=phenyl:
  (XXX) α - Benzoyl - α - phenylthio - 4 - [N - (p-tolyl)-N-(γ-phenylpropyl)sulfamyl]acetanilide
R=4-nitrophenyl:
  (XXXI) α - Benzoyl - α - (4 - nitrophenylthio) - 4-[N - (p - tolyl) - N - (γ - phenylpropyl)sulfamyl]acetanilide
R=3-butylcarbamylphenyl:
  (XXXII) α - Benzoyl - α - (3 - butylcarbamylphenylthio) - 4 - [N - (p - tolyl) - N - (γ - phenylpropyl)sulfamyl]acetanilide R=3-butylcarbamylphenyl:
  (XXXIII) α - (3 - butylcarbamylphenylthio) - α-{3 - [α - (2,4 - di - tert - amylphenoxy)butyramido]benzoyl}-2 - methoxyacetanilide
R=phenyl:
  (XXXIV) α - {3 - [α - (di - tert - amylphenoxy)butyramido]benzoyl} - α - phenylthio - 2 -methoxyacetanilide R=phenyl:
(XXXV) 1 - phenyl - 3 - {3 - [α - (2,4 - di- tert-amyl-phenoxy)acetamido] - benzamido} - 4 - phenyl-thio-5-pyrazolone 1 - [4 - (4 - tert - butylphenoxy)phenyl] - 3 - [α - (4-tert - butylphenoxy)propionamido] - 4 - (1 - phenyl-5-tetrazolylthio)-5-pyrazolone 1 - hydroxy-4-(1-phenyl-5-tetrazolylthio)-3',5'-dicarboxy-2-naphthanilide (XXXIX)
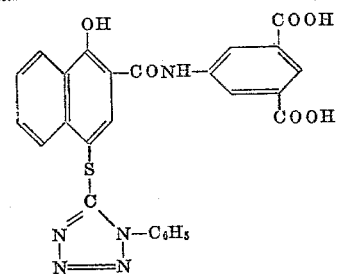

(XXXVI)
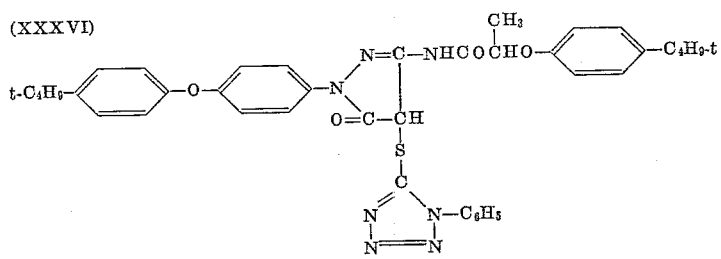

CLASS I–B–2

*Diffusible Colorless DIR Couplers Which Yield Non-diffusible Dyes and Diffusible Development Inhibitors*

1 - hydroxy - 4 - (1 - phenyl - 5 - tetrazolylthio) - N - ethyl-2-naphthamide (XXXVII)
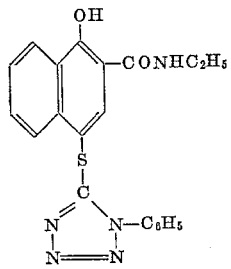

1 - hydroxy - 4 - (1 - phenyl-5-tetrazolylthio)-2-naphthoic acid (XL)
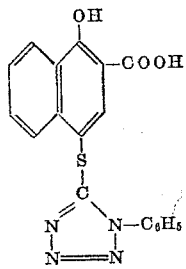

The Williams et al. U.S. patent application Serial No. 780,710, filed December 16, 1958, may be referred to for the precise formulae and syntheses of the above coupler compounds.

CLASS I–B–3

*Diffusible Colorless DIR Couplers Which Yield Diffusible Dyes and Diffusible Development Inhibitors*

1 - hydroxy - 4 - (1-phenyl-5-tetrazolylthio)-N-(β - sulfo-ethyl)-2-naphthamide sodium salt (XXXVIII)
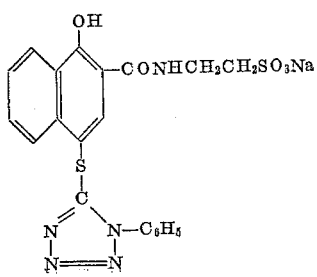

The above thio ether couplers have the following general formula:

$$Cp\text{—}Y\text{—}R$$

wherein Cp is a coupler moiety capable of forming a dye with oxidized color developers, Y is a sulfur atom attached to the coupling position of the coupler moiety and R represents an organic moiety such as an alkyl group, a cyclic radical, e.g., a heterocyclic group, aryl groups of the benzene or naphthalene series, etc., which splits off the coupler moiety together with the sulfur atom during color development to yield a diffusible mercapto compound such as a thiophenol which inhibits the development of silver halide in adjacent areas in the processes of the invention.

CLASS II–C

*Nondiffusible Colored DIR Couplers Which Yield Nondiffusible Dyes and Diffusible Development Inhibitors*

1 - [4 - (4-tert-butylphenoxy)phenyl]-3-stearamido-4-(5-benzotriazolylazo)-5-pyrazolone
(XLI)

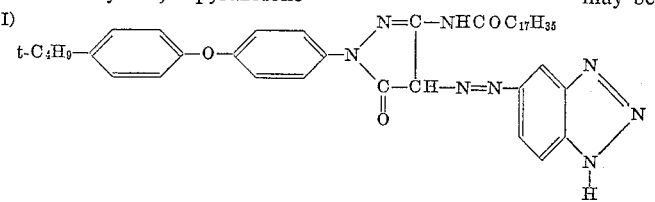

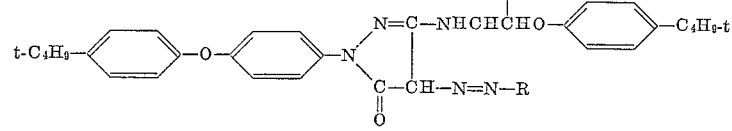

wherein R is as indicated below in the following specific compounds.

R=3-(5-mercapto-1-tetrazolyl)phenyl:
   (XLII) 1 - [4 - (4 - tert - butylphenoxy)phenyl]-3 - [α-(4-tert-butylphenoxy)-propionamido]-4-[3-(5 - mercapto - 1 - tetrazolyl)phenylazo]-5-pyrazolone R=4-benzotriazolyl:
   (XLIII) 1 - [4-(4-tert-butylphenoxy)phenyl]-3-[α-(4-tert-butylphenoxy)propionamido]-4-(4 - benzotriazolylazo)-5-pyrazolone R=3-(5-methyl-1,2,4-triazolyl):
   (XLIV) 1 - [4 - (4-tert-butylphenoxy)phenyl]-3-[α-(4 - tert - butylphenoxy)-propionamido]-4-[3-(5-methyl-1,2,4-triazolyl)azo]-5-pyrazolone R=5-benzotriazolyl:
   (XLV) 1 - [4 - (4 - tert-butylphenoxy)phenyl]-3-[α-(4- - tert - butylphenoxy) - propionamido]-4-(5-benzotriazolylazo)-5-pyrazolone R=3-methylbenzotriazolium-6-yl-p-toluenesulfonate:
   (XLVI) 1 - [4-(4-tert-butylphenoxy)phenyl]-3-[α-(4-tert-butylphenoxy) propionamido]-4-(3-methylbenzothiazolium-6-yl-azo)-5-pyrazolone p - toluene-sulfonate 1 - dodecyl - 3 - [α-(2,4-di-tert-amylphenoxy)acetamido]-4-(4-benzotriazolyl-azo)-5-pyrazolone
(XLVII)

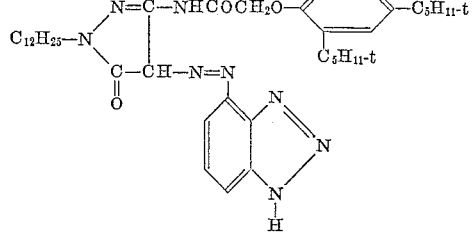

1 - hydroxy-4-(4-benzotriazolyl-azo)-N-[δ-(2,4 - di - tert-amylphenoxy) butyl]-2-naphthamide
(XLVIII)

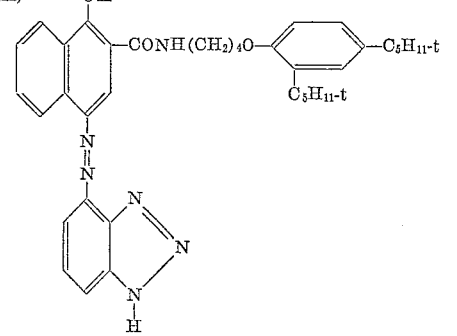

These coupler compounds split off triazolyl, thiazolyl and tetrazolyl moieties during the development of emulsion layers which moieties form diffusible development-inhibiting substances.

The well-known open-chain reactive methylene couplers may be substituted similarly to the above couplers in the coupling position to produce useful DIR couplers of this class.

The couplers XLI to XLVIII have the following general formula

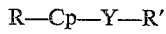

R—Cp—Y—R′ wherein Cp is a coupler moiety such as a phenolic, 5-pyrazolone or open-chain reactive methylene coupler, R is a ballast group of which there may be more than one, rendering the coupler nondiffusing, Y is a splittable linkage such as an azo linkage joining a preformed development-inhibiting moiety R′, such as a phenylmercaptotetrazole group, to the coupler moiety in the coupling position.

CLASS II–D

*Nondiffusible Colorless DIR Couplers Which Yield Nondiffusible Dyes and Diffusible Development Inhibitors*

1 - hydroxy - 4 - [β-(4-benzotriazolyl)ethoxy]-N-[δ-(2,4-di-tert-amylphenoxy)butyl]-2-naphthamide
(XLIX)

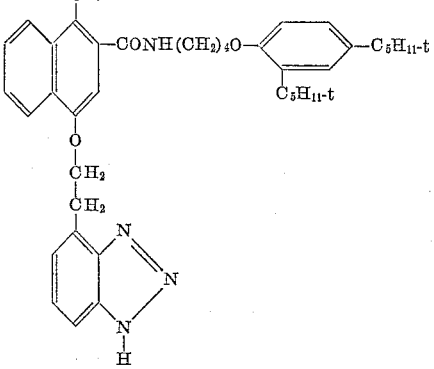

CLASS II–E

*Nondiffusible Colored DIR Couplers Which Yield Diffusible Development-Inhibiting Dyes*

3-carboxymethyl-5-(4-dodecyloxyphenylazo)rhodanine
(LI) 3 - carboxymethyl-5-(4 - octadecyloxyphenylazo)-rhodanine (L) 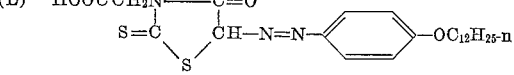

(LII) 1-(4-carboxyphenyl)-3-acetylmercaptoacetamido)-4-(4-dodecyloxyphenylazo)-5-pyrazolone
(LIII) 1 - thiocarbamyl-3-methyl-4-(4-dodecyloxyphenylazo)-5-pyrazolone
(LIV) 1 - phenyl-3-phenylthiocarbamylamino-4 - (4 - dodecyloxyphenylazo)-5-pyrazolone It will be seen from the structural formulae of these couplers that contrary to the Class II–C, and II–D couplers above, during color development the ballast group splits off and the coupler moiety itself such as a rhodanine, mercaptoacetamido or, thiocarbamylamino substituted coupler, forms a diffusible dye with the oxidized color developer, which dye itself comprises the development-inhibiting compound capable of diffusing to adjacent silver halide to inhibit development in the desired process.

The couplers L to LIV represent those having the following general formula:

$$R—Y—R_1$$

wherein R is a coupler moiety capable of reaction with oxidized color developer to form a diffusible dye inhibiting silver halide development, $R_1$ is a ballast group which may render the coupler nondiffusing, joined to the coupler moiety in the coupling position by means of the splittable linkage Y such as an azo linkage.

CLASS II–F

*Nondiffusible Colorless DIR Couplers Which Yield Diffusible Development-Inhibiting Dyes*

4,4'-(4 - octadecylbenzylidene)-bis[1-(4-benzotriazolyl)-3-carboxy-5-pyrazolone]

(LV)

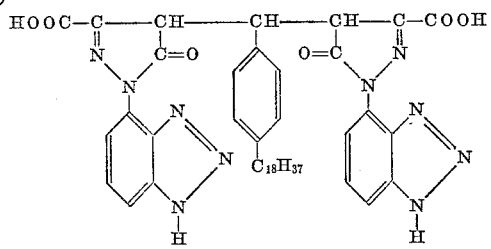

In the accompanying figures, 1 and 2, is illustrated the result of using the DIR couplers such as those having the formula:

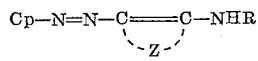

(as previously detailed) in the processes of the invention. In FIGURES 3 to 12 are shown various sensitive elements employing the DIR coupler compounds which elements are contemplated by our invention in its broad aspects.

The above couplers are useful in the processes of the invention in order to control development of emulsion layers particularly in the presence of nondiffusing image-forming coupler compounds, in order to vary the sensitometric and physical characteristics of the dye images obtained from the latter couplers. That is, it is well known in color photography that upon development of the silver halide emulsions with color developing agents in the presence of coupler compounds, the dye obtained by reaction of the oxidized developing agent with the coupler at the site of exposure surrounds the silver halide crystal in a somewhat diffuse manner as shown in FIGURE 1A. This results in more grain and less definition being obtained in the dye images than is desired. A typical sensitometric curve of such dye images is shown in curve 1 of FIGURE 2.

In the Weller et al. U.S. Patent 2,689,793 granted September 21, 1954, it has been shown that substantial improvement in grain can be effected by use of increased amounts of silver halide in the emulsions and the concomitant use in conjunction with the usual nondiffusing image-forming couplers, of competing coupler compounds of the type which form diffusible dyes with oxidized developing agent. As a result, some of the exposed silver halide is expended in the formation of the diffusible dye and the remaining silver halide is used in forming the nondiffusing image dye. In such a process using a competing coupler, the nondiffusing dye image is distributed less diffusely about the silver halide crystal in the manner shown in FIGURE 1B. A typical sensitometric curve of such a dye image is shown in FIGURE 2, curve 2, from which it is apparent that an appreciable loss of speed has occurred, most evident in the toe region of the sensitometric curve, accompanied by an increase in contrast in the toe region.

When the processes of the present invention are carried out by use of emulsion layers containing comparatively large amounts of silver halide and development is carried out in the presence of the DIR coupler compounds as well as in the presence of the usual nondiffusing image-forming couplers, the development-inhibiting substance released from the couplers locally inhibits development of the silver halide crystals and dye images are distributed about the silver halide crystals somewhat as shown in FIGURE 1C with the result that substantial improvement in grain results.

The effect observed appears to be due to the fact that during development of the silver halide grain in the presence of the DIR coupler development takes place at a number of development centers in each grain, causing growth of a corresponding number of silver grains appearing somewhat as shown in FIGURE 1D, wherein are shown two silver grains and their filamentary silver appendages. Upon fixation of the emulsion the undeveloped portion of the original silver halide grain is removed leaving in this case two small silver grains rather than a single large silver grain. Accordingly the dye images formed about these grains during development are distributed as shown in FIGURE 1C. Example 5a may be referred to for a process illustrating these effects. A typical sensitometric curve of these dye images is shown in curve 3 of FIGURE 2 in which it is apparent that the development-inhibiting substance has lowered the contrast of the dye image and the speed in the toe region has been increased. A similar effect is obtained when ordinary black-and-white emulsions are developed with color developing agents in the presence of the DIR couplers, that is, the contrast of the characteristic curve and the grain of the silver image is lowered (see Example 5).

In FIGURE 3 is shown in greatly enlarged sectional view a sensitive element contemplated by our invention wherein the DIR coupler is distributed contiguous to the silver halide, i.e., in the emulsion together with a nondiffusing image-forming coupler.

In the elements of FIGURES 4 and 4A the DIR coupler is also present in a layer contiguous to the emulsion layer, i.e., effectively in the adjacent layer.

In this case an increase in density of the microstructure relative to the macrostructure of the dye image is obtained, resulting in an improvement in image sharpness.

In FIGURE 5 is shown the use of the DIR couplers in a multilayer color film in layer 12 between a pair of emulsion layers 11 and 13. In such a film the emulsions 11, 13 and 14 may be sensitized to different regions of the visible spectrum and the image-forming couplers may be couplers suitable for the formation of subtractively colored dye images complementary of color to the sensitivity of the emulsion layers. In such a film, if desired, the DIR coupler can be present in one or more of the emulsion layers or may be present in interlayers separating each emulsion from the other, e.g., between layers 11 and 13 as shown and between layers 13 and 14. When the DIR couplers are used in this manner, the development-inhibiting substance produced in each emulsion layer as a function of exposure mutually inhibits development in the adjacent emulsion layer, thus providing an automatic method for color correction as will be described in more detail below.

In FIGURE 6 is shown a specialized use for the DIR couplers wherein layer 11 contains fogged silver halide together with a coupler forming a diffusible dye with oxidized color developing agent and layer 12 comprises light-sensitive negative emulsion and one of the DIR couplers of the invention. The element of FIGURE 6 is employed in the color transfer processes described in the Williams et al. invention mentioned above, according to which the element is locally exposed, developed with a color developer to form development inhibiting compound in the region of exposure of layer 12 which migrates image-wise to layer 11 to locally inhibit development of the fogged silver halide. The residual uninhibited fogged silver halide then develops and a soluble dye is formed in the position region of development which dye transfers image-wise to a mordanted reception layer. Our invention in its broadest aspects contemplates such photographic elements composed of silver halide and contiguous DIR coupler compounds. By use of a plurality of fogged emulsions and contiguous couplers yielding subtractively colored diffusible dye images as a function of the development-inhibiting substance formed in adjacent negative emulsions, full color reproductions are obtainable by the process of the mentioned Williams et al. invention, a detailed Example 4a of which is provided below.

FIGURE 7 illustrates a multilayer sensitive element in which the interimage effects of the DIR couplers can be utilized to give color correction.

FIGURE 8 illustrates a multilayer film employing the DIR couplers to effect color correction.

FIGURE 9 illustrates a multilayer film in which the DIR couplers are present together with the image couplers to impart a mutual development-inhibiting effect upon an adjacent layer and thus produce color correction.

FIGURE 10 illustrates a packet system in which the DIR couplers effect color correction of the image dyes.

FIGURE 11 illustrates the use of the DIR couplers to control the formation of masking images in a multilayer color film.

EXAMPLE 1

*Use of DIR Coupler to Produce Unsharp Masking Effect*

FILM A

Figure 4:
Figure 4A:

A film was prepared having the structure shown in FIGURE 4 of the drawings as follows:

A subbed film base 10 was coated with a 0.006 inch thick coating 11 of a solution of 200 mgs. of coupler L (a coupler forming a diffusible development-inhibiting dye with oxidized color developing agent) 1.5 cc. of 5% Alkanol B and 2 cc. of 7% saponin solution in 20 cc. of 5% gelatin solution.

This coating was followed by a 0.003 inch thick gelatin coating 12 and a 0.006 inch thick coating 13 of a gelatin silver halide emulsion.

FILM B (CONTROL)

Same as Film A but coupler L was replaced by the coupler 1 - phenyl-3-(3-sulfobenzamido-4-n-octadecyloxy-phenyl-azo) -5-pyrazolone sodium salt (a coupler forming a diffusible dye with oxidized color developing agent).

Films A and B were each exposed under a test subject and processed in the following developer:

| | | |
|---|---|---|
| Benzyl | ml | 10.0 |
| Sodium thiocyanate | gm | 0.2 |
| 2-amino-5-diethyl-aminotoluene hydrochloride | gm | 8.0 |
| Hydroquinone disulfonate | gm | 2.5 |
| Sodium sulfite | gm | 2.0 |
| Sodium carbonate | gm | 34.0 |
| Quadrafos | gm | 2.0 |
| Sodium hydroxide | gm | 1.57 |
| Potassium bromide | gm | 1.5 |
| Benzotriazole | gm | 0.03 |

Water to 1.0 liter.

As a result, a silver image was developed in layer 13 of each film and the oxidized developing agent thus formed coupled with each of the coupler moieties to form diffusible dyes. In the case of Film A the diffusible rhodanine dye formed from coupler L had a development-inhibiting effect on the development of the silver image such that a pronounced improvement in image sharpness was observed compared to the image in Film B.

This example illustrates the use of sensitive elements in which the DIR coupler forms a dye with the oxidized developing agent which dye is also the development-inhibiting compound. The coupler in this example is effectively contiguous to the emulsion, that is, present in an effectively adjacent hydrophilic colloid layer, in case of Film A the coupled layer being separated from the emulsion layer by only a very thin gelatin layer to produce the desired effect. In other cases it may be desirable to have the coupler present in the emulsion or in a layer in direct contact with the emulsion layer.

EXAMPLE 1a

*Use of a DIR Coupler To Produce an Unsharp Masking Effect*

When the experiment as described in Example 1 was repeated using DIR coupler XLVIII instead of DIR coupler L, an improvement in image sharpness similar to that observed in Example 1 was noted.

EXAMPLE 2

*Interimage Effects of the DIR Couplers in Multilayer Color Films*

To a red-sensitive silver bromoiodide emulsion was added a sufficient amount of the coupler 2-[α-(2,4-di-tert. amylphenoxy)-butyramido]-4,6 - dichloro - 5 - methylphenol, dibutyl phthalate and gelatin, that upon coating on a subbed film base 0.2 gram per square foot of silver 0.107 gram per square foot of coupler, 0.05 gram per square foot of dibutyl phthalate and 0.578 gram per square foot of gelatin was obtained.

This emulsion coating was followed by a coating containing 0.181 gram per square foot of gelatin, 0.005 gram per square foot of dioctyl hydroquinone and 0.005 gram per square foot of tricresyl phosphate.

Three samples of this film were over-coated with the following:

(I) A green-sensitive silver bromoiodide emulsion containing 0.2 gram silver per square foot, 0.1 gram of the colorless magenta coupler 1-(2,4,6-trichlorophenyl)-3-{3-[α-(2,4 - di-tert - amylphenoxy)-acetamido]-benzamido}-5-pyrazolone per square foot, 0.05 gram of tricresyl phosphate per square foot and 0.364 gram of gelatin per square foot.

(II) A green-sensitive silver bromoiodide emulsion containing 0.2 gram silver per square foot, 0.21 gram of the DIR coupler (V) per square foot, 0.06 gram tricresyl phosphate per square foot and 0.364 gram gelatin per square foot.

(III) A green-sensitive silver bromoiodide emulsion containing 0.2 gram silver per square foot, 0.1 gram of the DIR coupler (IV) per square foot, 0.05 gram tricresyl phosphate per square foot and 0.364 gram gelatin per square foot.

Each of the three films consisting of a red-sensitive emulsion containing a colorless cyan-forming coupler and an overlying green-sensitive emulsion containing a magenta-forming coupler were given separate red and white light exposures under a step tablet and developed for 10 minutes in the following developer solution at 68° F.:

| | | |
|---|---|---|
| Benzyl alcohol | cc | 4.0 |
| Sodium hexamethaphosphate | grams | 2.0 |
| Sodium sulfite, anhydrous | do | 2.0 |
| N-ethyl-β-methane sulfonamido ethyl-3-methyl-4-amino aniline | do | 5.0 |
| Sodium carbonate, anhydrous | do | 50.0 |
| Potassium bromide | do | 1.0 |
| Sodium hydroxide | do | 0.5 |

Water to 1.0 liter.

Each film was then fixed, washed and dried. When the sensitometric curves of the films having coatings I, II and III were compared, it was found that the cyan dye curves resulting from red and white light exposure of Film I were substantially identical in gamma whereas in coatings II and III the gamma of the red light record obtained by the exposure to white light was appreciably less than the gamma of the red record resulting from exposure to red light. That is, the white light exposure of the films was recorded in both the red and green-sensitive emulsion layers and upon development of II and III the development-inhibiting substance released from couplers V and IV had migrated to the lower emulsion layer and reduced the gamma of the red record as a function of the development of the magenta dye image of the overlying emulsion layer.

This example illustrates the manner in which the DIR couplers can be used in one emulsion layer to control development in one or more contiguous emulsion layers. Thus, as shown in FIGURE 5, a multilayer color film can be prepared having the DIR couplers present in one or more of the differentially light-sensitive emulsion layers or in interlayers between the emulsion layers, and the development in one layer results in the formation of a development inhibiting substance which will control the development, for example, reduce gamma in adjacent emulsion layers as function of the exposure and development of the first layer.

EXAMPLE 3

*Color Transfer Process Using DIR Couplers To Obtain a Reversal Image*

As shown in FIGURE 6 a film base was coated with a silver bromoiodide emulsion layer 11 containing the following:

| | |
|---|---|
| 1 - phenyl - 3 - (3,5 - disulfobenzamido) - 4 - (2-hydroxy - 4 - pentadecylphenylazo) - 5 - pyrazolone _____grams__ | 0.8 |
| Water _____cc__ | 40.0 |
| Sodium hydroxide 10% solution _____cc__ | 5.0 |
| Gelatin 10% solution _____cc__ | 100.0 |
| Saponin 7.5% solution _____cc__ | 16.0 |
| Alkanol B solution 5% _____cc__ | 8.0 |
| Silver bromoiodide emulsion _____cc__ | 8.0 |

This emulsion was prepared by stirring the coupler in the water containing the sodium hydroxide and this solution poured into the gelatin solution followed by adjusting the pH to 6.8. The remaining ingredients were then added and the emulsion held at 40° C. for 30 minutes before coating. Thereafter, samples of the coating were fogged by exposure for 30 seconds under a 40-watt bulb at a distance of 60 inches.

Eleven emulsions were prepared containing the following:

| | |
|---|---|
| Coupler [1] _____grams__ | 0.75 |
| 2,4-di-n-amylphenol _____cc__ | 0.75 |
| Dimethylformamide _____cc__ | 0.75 |
| Gelatin solution 10% _____cc__ | 18.75 |
| Alkanol B solution 5% _____cc__ | 1.5 |
| Water _____cc__ | 7.5 |
| Saponin solution 7.5% aqueous _____cc__ | 1.5 |
| Silver chlorobromide emulsion _____cc__ | 10.0 |

[1] The couplers used in preparing the eleven emulsions were VII, XIII, XIV, XVI, XVII, XVIII, XIX, XXII, XXV, XXVa, XXVII.

The emulsions were prepared by dissolving the coupler in diamylphenol and dimethylformamide by heating at 80° C., then adding the gelatin solution at 40° C. followed by the Alkanol B solution and milling five times in a colloid mill. The remaining ingredients were then added and the emulsion held for 30 minutes at 40° C. before coating as layer 12 upon the fogged emulsion layer 11 of FIGURE 6.

The eleven films were then exposed under a step tablet and each treated with the following developer composition:

| | |
|---|---|
| Sodium hexametaphosphate _____grams__ | 0.2 |
| Benzyl alcohol _____cc__ | 1.0 |
| 3-acetamido-4-amino-N,N-diethyl aniline ___grams__ | 0.2 |
| Sodium carbonate anhydrous _____do____ | 2.0 |
| Water to 100.0 cc. | |
| pH adjusted to 11. | |

Development of each sample was allowed to proceed while each emulsion was in contact with a reception layer containing cetyl trimethyl ammonium bromide mordant with the result that in each of the eleven examples the oxidized developing agent formed at the region of exposure coupled with the coupler in the emulsion thus releasing the corresponding mercapto compound which diffused to the lower emulsion layer 11 inhibiting development therein as a function of the exposure in the top layer. The residual uninhibited fogged silver halide then developed, the oxidized developer reacting with the coupler to form a diffusible dye in each sample which transferred to the mordanted sheet forming a positive magenta dye image thereon.

By the use of several emulsion layers sensitive to different spectral regions and containing or having one of the above-mentioned DIR couplers adjacent thereto, and adjacent to each emulsion a fogged emulsion containing a coupler forming a subtractively colored diffusible dye, color development in contact with a mordanted sheet results in the transfer of a multicolor image as illustrated in Example 4a below.

EXAMPLE 4

*Reversal Color Transfer Process Using a DIR Coupler To Control Formation of Diffusible Dye Image*

A subbed cellulose acetate film support was coated at a thickness of 0.003 inch with bromoiodide emulsion prepared as follows: 0.4 part of the coupler 1-phenyl-3-(3,5-disulfobenzamido)-4-(n-octadecyloxyphenylazo)-5-pyrazolone di-sodium salt was stirred at room temperature in 20 volumes of water and 5 volumes of 10% sodium hydroxide solution were added. The solution was then poured into 50 volumes of 10% gelatin solution at 40° C. and 4 volumes of 7% saponin solution added. The pH was then adjusted to 6.8 following which 2 volumes of a bromoiodide emulsion were added, stirred for 2 minutes, left standing at 40° C. for 30 minutes, filtered and coated. The coating was then fogged by exposure to a 40 watt bulb at 60 inches for 30 seconds.

The fogged emulsion layer was then over-coated at a thickness of 0.003 inch with an emulsion prepared as follows: 3 parts of the coupler 1-hydroxy-4-(2-aminophenylazo)-N-[δ-(2,4-di - tert - amylphenoxy)butyl] - 2-naphthamide (III) were dissolved in 3 volumes of 2,4-di-amylphenol and 3 volumes of dimethylformamide by heating to 80° C. with stirring. This solution was added to 75 volumes of 10% gelatin solution at 40° C. and 6 volumes of Alkanol B (5% solution). This suspension was then milled 5 times in a colloid mill and the residual dispersion washed from the mill with 30 volumes of water and 6 volumes of 7% saponin solution. To the total dispersion was added, under reduced illumination, 41 volumes of a chlorobromide emulsion and the whole stirred 2 minutes, allowed to stand at 40° C. for 30 minutes, filtered and coated.

The sensitive element thus prepared would appear substantially as shown in FIGURE 6 of the drawings containing the mentioned 5-pyrazolone colored coupler in the fogged emulsion layer 11 and the mentioned naphthol coupler containing the 2-aminophenylazo substituent in emulsion layer 12 which has a shorter development induction period than the emulsion of layer 11.

The film was then exposed to record an image in layer 12 followed by development for 3 minutes at 70° F. in contact with a gelatin reception layer containing 0.5 gm. of cetyl trimethyl ammonium bromide in 25 cc. of 10% gelatin solution at a thickness of 0.006 inch coated on a subbed film base, the following developer solution being suitable:

| | |
|---|---|
| Sodium carbonate _____gm__ | 20.0 |
| Sodium hexametaphosphate _____gm__ | 2.0 |
| Benzyl alcohol _____cc__ | 10.0 |
| 3-acetamido-4-amino-N,N-diethylaniline ____gm__ | 2.0 |

Water to 1.0 liter.
pH adjusted to 11.0.

A convenient way for effecting development is to wet both the sensitive element and the reception layer with the developer solution then squeeze together. As development proceeds the 2-aminophenylazo moiety splits off from the DIR coupler and cyclizes to form benzotriazole which diffuses imagewise from the upper emulsion layer 12 to inhibit the development of the corresponding region of the lower fogged emulsion layer 11, as a function of the negative development in the top emulsion layer. The color developer then develops the lower emulsion layer 11 in the areas where no development inhibitor is present. The oxidized developing agent resulting then couples with the 5-pyrazolone coupler therein, forming a soluble dye which diffuses imagewise to the mordanted reception layer forming a positive magenta dye image thereon.

In the above procedure, if desired, the color developing agent may be contained in either the outer emulsion layer or in the mordanted reception layer whereby development of the exposed element is initiated by use of an alkaline solution such as the above developer solution devoid of the color developing agent.

The mentioned patent work of Williams et al. may be referred to for additional examples of use of the DIR couplers to control the formation of soluble dye images in contiguous fogged emulsions.

EXAMPLE 4a

*Use of DIR Couplers To Obtain a Full Color Reproduction in a One-Step Reversal Process*

Figure 12:
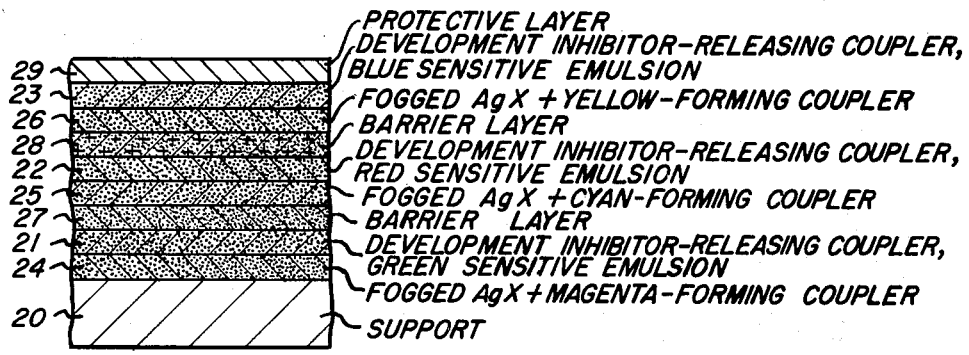
FIGURE 12 illustrates the use of DIR couplers to obtain a full color reproduction in a one-step reversal process.

A sensitive element of the structure shown in FIGURE 12 may be prepared as follows:

Layer 20—Subbed cellulose ester or similar paper or film support.
Layer 24—The following emulsion containing 3% gelatin coated over 3600 sq. ft. of layer 20:
(1) A fogged chlorobromiodide emulsion containing one mole of AgX,
(2) 8400 cc. of a 1.5 aqueous solution of coupler LVI 1-phenyl-3-(3,5-disulfobenzamindo)-4-octadecyloxyphenylazo-5-pyrazolone,
(3) 740 cc. of 7.5% saponin in water,
(4) 134 cc. of 2.7% mucochloric acid in water,
(5) Water to make 22,100 g.

The resulting layer contained 30 mg. of silver/square foot, 35 mg. of coupler/square foot, and 184 mg. of gelatin/square foot.

Layer 21—The following emulsion coated over 1740 sq. ft. of layer 24:
(1) A green-sensitized chlorobromoiodide emulsion containing one mole of silver halide,
(2) A 1:1 ratio of coupler to coupler solvent dispersion of 159 g. of coupler XVI, 1-hydroxy-4-(2-nitrophenylthio) - N - [δ-(2,4 - di - tert - amylphenoxy)butyl]-2-naphthamide, in 159 cc. of 2,4-di-n-amyphenol dispersed in an aqueous gelatin-Alkanol B solution,
(3) 400 cc. of 7.5% saponin,
(4) 73 cc. of 2.7% mucochloric acid, and
(5) Water to make 12,000 g.

The resulting layer contained 62 mg. of silver-square foot, 91 mg. of coupler and coupler solvent-square foot, and 214 mg. of gelatin-square foot.

Layer 27—The following coated over 1080 sq. ft. of layer 21:
(1) A silver chloride emulsion containing one mole of AgX,
(2) 216 cc. of 7.5% saponin,
(3) 43 cc. of 2.7% mucochloric acid, and
(4) Water to make 6480 g.

The resulting layer contained 100 mg. of silver/square foot and 200 mg. of gelatin/square foot. This layer, as in the case of layer 28 serves to prevent the excess development - inhibiting substance released from coupler LVIa from wandering to adjacent emulsion layers and adversely affecting their development. It appears that in so doing the silver chloride absorbs the inhibitor compound such as 2-nitrothiophenol.

Layer 25—This layer had the composition of layer 24 except that the solution (2) of coupler LVII was replaced by a solution of 315 g. of coupler LVII, 2-(3,5-disulfobenzamido) - 5-methyl-4-(4-octadecyloxyphenylazo)phenol dipotassium salt, in 13085 cc. of water. The coating contained 87 mg. LVI per square foot.

Layer 22—This layer was coated in the manner of layer 21 except using one mole of red-sensitive chlorobromide emulsion instead of the green-sensitive emulsion.

Layer 28—This layer was coated in the manner of layer 27 except including sufficient yellow colloidal silver dispersion to obtain 4.6 mg. per square foot.

Layer 26—This coating was applied to layer 28 in the same manner as layer 25 except that the solution of coupler LVII was replaced by an aqueous solution made by adding 315 g. of coupler LVIII, 1-hydroxy-4-[4-{3-methyl - 4 - [3 - (1,5 - disulfo)naphthylazo]-1-pyrazolyl}phenylazo]-N-[δ - (3 - pentadecylphenoxy)butyl]-2-naphthamide dipotassium salt, in 10,000 cc. water and 1,000 cc. of 28% ammonium hydroxide solution to 5400 g. of 10% gelatin solution and neutralizing with citric acid to a pH of 7.

Layer 23—This layer was coated in the same manner as layer 21 except using one mole of blue-sensitive chlorobromide emulsion.

Layer 29—Is not essential to this invention but may be a clear gelatin protective layer or a removable hydrophilic colloid layer for reception of the multicolor image.

The film constructed as described may be exposed to a colored subject as in a camera or by contact or projection printing methods, then wetted with a color developing composition such as disclosed in Example 3 above and the film squeegeed into contact with a reception element such as described in Example 3. Emulsions 21, 22 and 23 recording the green, red, and blue separation images of the subject then develop with the result that the oxidation product of this developing agent couples with coupler XVI to form nondiffusing dye images in layers 21, 22 and 23 in the regions of exposure and splitting off the development inhibiting 2-nitrophenylthio moiety in the same regions which diffuses imagewise to the adjacent fogged emulsions 24, 25 and 26, respectively, to locally inhibit development in the negative regions. In the positive regions of layers 24, 25 and 26 the silver halide develops the dye-forming couplers LVI, LVII and LVIII couple with the oxidized developing agent, in the case of LVIII split off a diffusible yellow azo dye from the coupler molecule. The magenta, cyan and yellow dyes then diffuse imagewise to the reception layer and are mordanted therein to provide a positive color reproduction of the subjects. Additional prints can be obtained by at once squeegeeing fresh reception layers into contact with the moist film and transferring additional portions of the three dye images thereto.

EXAMPLE 5

*Use of Soluble DIR Couplers in the Developer Solution To Control the Grain and Contrast of Silver Images in Black-and-White Photography*

This example illustrates the development of silver images in the presence of the DIR coupler compounds, the DIR coupler in the case being present in the developer solution.

A silver bromoiodide emulsion was exposed for 10 seconds to a high-intensity lamp at 18 inches through a neutral density step tablet and processed as follows:

| | |
|---|---|
| Development | 8 minutes at 70° F. |
| Rinse | 30 seconds. |
| Fix | 5 minutes. |
| Wash | 10 minutes. |
| Dry | |

The following developer solutions were used.

Developer No. 1:
| | | |
|---|---|---|
| Developing agent [1] | grams | 1.0 |
| Sodium hexametaphosphate | do | 0.2 |
| Benzyl alcohol | cc | 1.0 |
| Sodium carbonate anhydrous | grams | 1.0 |
| Coupler [2] | do | 0.25 |
| Water | cc | 100.0 |

Developer No. 2:
| | | |
|---|---|---|
| Developing agent [1] | grams | 1.0 |
| Sodium hexametaphosphate | do | 0.2 |
| Benzyl alcohol | cc | 1.0 |
| Sodium carbonate anhydrous | grams | 1.0 |
| Coupler [3] | do | 0.25 |
| Water | cc | 100.0 |

Developer No. 3 (control):
| | | |
|---|---|---|
| Developing agent [1] | grams | 1.0 |
| Sodium hexametaphosphate | do | 0.2 |
| Benzyl alcohol | cc | 1.0 |
| Sodium carbonate anhydrous | grams | 1.0 |
| Coupler [4] | do | 0.17 |
| Water | cc | 100.0 |

[1] p-Amino-N-ethyl-N-β-hydroxyethylaniline sulfate.
[2] 1-hydroxy-4-(1-phenyl-5-tetrazolylthio)-2-naphthoic acid (XL).
[3] 1-hydroxy-4-(2-amino-4-methoxyphenylazo)-N-(β-sulfoethyl)-2-naphthamide sodium salt (XII).
[4] 1-hydroxy-4-chloro-2-naphthoic acid.

The above developers were all adjusted to pH 11 with sodium hydroxide solution.

Figure 1A:
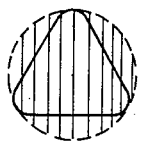
Figure 1B:
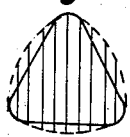
Figure 1C:
Figure 1D:
Figure 2:
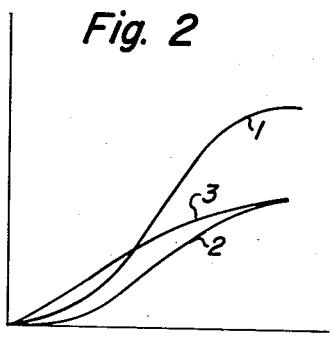
Figure 3:
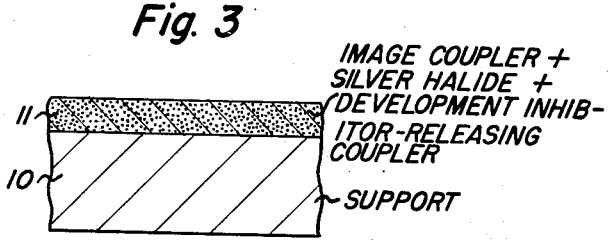

During development of the film the silver image was formed in each emulsion and each coupler reacted with the oxidized developing agent to form a soluble dye which washed out of the film. The couplers in developers 1 and 2 also yielded the development-inhibiting compounds phenylmercaptotetrazole and methoxybenzotriazole, respectively. When the characteristic curves of the three films where plotted and compared, it was found that the contrast of the films developed with developers 1 and 2 were considerably lower than the contrast of the film developed with developer 3 since the development-inhibiting substances released from the couplers in developers 1 and 2 caused a reduction in contrast illustrated in curve 3, FIGURE 2. In addition, the samples developed with developers 1 and 2 showed a considerable reduction in grain size of the developed silver obtained by use of the soluble DIR coupler.

EXAMPLE 5a

*Use of Soluble DIR Couplers in the Developer Solution To Control the Grain and Contrast of Dye Images in Color Photography*

This example illustrates the formation of dye images in the presence of the DIR coupler compounds, the DIR coupler in this case being present in the developer solution.

A silver bromoiodide emulsion containing an incorporated image-forming coupler was exposed for ten seconds to a high intensity lamp at 18 inches through a neutral density step tablet and processed in accordance to the procedure given under Example 5.

The contrast and grain of the dye image was reduced, when development was carried out in the presence of the soluble DIR coupler (XL and XII).

EXAMPLE 6

*Photographic Color Correction Using Interlayers Containing a DIR Coupler*

The well-known deficiencies of dyes obtained by color development in color films can be compensated for by use of the DIR couplers of the invention in the manner of the following example wherein pairs of differently sensitized emulsions are developed in the presence of each other and a DIR coupler so that the development in one layer is controlled by the formation of development-inhibiting substance in another layer.

FILM A

A subbed film support 10 was coated, as shown in FIGURE 7, with a green-sensitive bromoiodide emulsion layer 11 containing the following ingredients:

| | Mg./sq. ft. |
|---|---|
| Silver (as silver halide) | 100 |
| α-{4-[α-(2,4-di-tert-amylphenoxy)acetamido]-benzoyl}-2-methoxy acetanilide | 100 |
| Di-butylphthalate | 50 |
| Gelatin | 400 |

A red-sensitive emulsion was then coated as layer 12 and contained the following:

| | Mg./sq. ft. |
|---|---|
| Silver (as silver halide) | 100 |
| Compound XVI | 100 |
| 2,4-di-amylphenol | 100 |
| Gelatin | 350 |

Over layer 12 was coated a green-sensitive bromoiodide emulsion layer 13 containing the following:

| | Mg./sq. ft. |
|---|---|
| Silver (as silver halide) | 100 |
| 1-(2,4,6-trichlorophenyl)-3-[3-(2,4-di-tert-amylphenoxyacetamido)-benzamido]-5-pyrazolone | 100 |
| Tricresylphosphate | 50 |
| Gelatin | 350 |

FILM B

A second film was prepared in the same manner except using the following red-sensitive emulsion for layer 12 as a check:

| | Mg./sq. ft. |
|---|---|
| Silver (as silver halide) | 100 |
| 1-hydroxy-4-chloro-N-[δ-(2,4-di-tert-amylphenoxy)-n-butyl]-2-naphthamide | 100 |
| 2,4-di-amylphenol | 100 |
| Gelatin | 350 |

The Film A, prepared as described, appears substantially as shown in FIGURE 7 wherein layer 10 is the support carrying the green-sensitive emulsion layer 11 containing the nondiffusing yellow dye-forming coupler, the red-sensitive emulsion layer 12 containing the cyan dye-forming DIR coupler XVI and layer 13, the green-sensitive emulsion layer containing the magenta dye-forming coupler.

The two films, A and B, were each given a uniform exposure to green light and a red light exposure under a step tablet.

Two other samples of the films were each given the same red light exposure as the other films, but no green light exposure.

The four film samples were then processed using the "Processing Steps for Eastman Color Negative Film, Type 5248," described by Hanson and Kisner in Society of Motion Picture and Television Engineers, volume 61, pages 667–701, December 1953, the processing steps being as follows:

(1) Prebath _____ seconds__ 10
(2) Spray rinse _____ do____ 10–20
(3) Color developer _____ minutes__ 12
(4) Spray rinse _____ seconds__ 10–20
(5) First fixing bath _____ minutes__ 4
(6) Wash _____ do____ 4
(7) Bleach _____ do____ 8
(8) Wash _____ do____ 8
(9) Fix _____ do____ 4
(10) Wash _____ do____ 8
(11) Wetting agent _____ seconds__ 5–10
(12) Dry _____ do____ 15–20

In the color development step the development of the green-sensitive emulsions commences accompanied by the formation of yellow and magenta dyes respectively in layers 11 and 13. However, the red emulsion layer 12 is also undergoing development and the development-inhibiting substance 2-nitrothiophenol is being split off of the DIR coupler molecule to inhibit the development of both layer 11 and 13 in proportion to red light step tablet exposure of layer 12.

When the green light absorption curves of the magenta images obtained in coatings A and B were compared, it was found that both couplers used in layer 12 inhibited development of the magenta image in layer 13 to some extent, but that in coating B seven times as much silver was developed as in coating A because of the pronounced restraining effect on development of the coupler of coating A. One result was that the magenta dye development in layer 13 was decreased in proportion to the exposure and development in the cyan layer 12, thus showing how the cyan image can be used to decrease development of a magenta image in a color film.

Color correction may be introduced into a multicolor film in the same manner by situating DIR couplers in interlayers between the differently sensitized layers of a color film constructed as described in FIGURE 8 of the drawings wherein layer 10 is the support, layers 11 and 13 are gelatino silver halide emulsions sensitive to red light, each containing a nondiffusing cyan forming coupler and separated by the green-sensitive emulsion layer 12 containing the DIR coupler such as the thiophenol coupler XVI above, layer 14 is an interlayer such as gelatin, layer 16 containing red-sensitive silver halide and a DIR coupler mentioned just above, separates the green-sensitive emulsions 15 and 17 each containing non-diffusing magenta forming couplers, layer 18 is a filter layer such as yellow colloidal silver and the final layer 19 is a blue-sensitive silver halide emulsion containing a nondiffusing yellow dye-forming coupler.

Upon color development of the film of FIGURE 8 in the manner described above, the development-inhibiting substances produced in layers 12 and 16 inhibit the development of the adjacent red- and green-sensitive emulsions, thus decreasing the amount of cyan and magenta dyes formed in proportion to the exposure of the layers containing the DIR coupler compounds.

EXAMPLE 7

*Photographic Color Correction Using Emulsion Layers Containing DIR Couplers*

A film support was provided with emulsion layers in the manner shown in FIGURE 9 as follows:

FILM A

Layer 11 is a red-sensitive bromoiodide emulsion containing:

Mg./sq. ft.
Silver (as silver halide) _____ 300
1 - hydroxy-N-[δ-(2′,4′-di-tert-amylphenoxy)-n-butyl]-2-naphthamide _____ 50
Gelatin _____ 500

Layers 12 and 14 contain 80 mg. gelatin/sq. ft.
Layer 13 is a green-sensitive emulsion layer containing:

Mg./sq. ft.
Silver (as silver halide) _____ 150
1 - (2,4,6-trichlorophenyl)-3-{3-[α-(2,4-di-tert-amylphenoxy)acetamido] - benzamido} - 5-pyrazolone _____ 50

FILM B

Same as Film A but layer 11 also contains 20 mg./sq. ft. of DIR coupler XXVI (containing the tetrazolylthio moiety).

FILM C

Layer 11, same as in Film A but containing green-sensitive emulsion and magenta coupler 1-(2,4,6-trichlorophenyl) - 3-{3-[α-(2,4-di-tert-amylphenoxy)acetamido]-benzamido}-5-pyrazolone. Layers 12 and 14 as in Film A. Layer 13 as in Film A but containing red-sensitive emulsion and the cyan coupler of layer 11 of Film A.

FILM D
(See FIGURE 9 element)

Same as Film C except layer 11 also contains 20 mg./sq. ft. of the DIR coupler XXXVI (containing the tetrazolylthio moiety) as well as the magenta image coupler.

Films A and B were given red light exposures under a step tablet and each uniformly flashed to green light then color developed in the Type 5248 process of Example 6. Upon comparison of the developed films it was found that the development of the magenta dye in layer 11 of Film B had decreased in proportion to the exposure and development in the underlying cyan layer and thus in proportion to the amount of development-inhibiting compound released from compound XXVI. Improved image sharpness was particularly evident.

Films C and D were given green light step table exposures and flashed to red light then developed in the Type 5248 process of Example 6 with the result that the development-inhibiting compound released in layer 11 of Film D decreased the development of the cyan image in layer 13. Also, a pronounced improvement in image sharpness was observed.

The improvement obtainable in image sharpness is conveniently demonstrated by preparing single layer coatings containing, e.g., 50 mg./sq. ft. of cyan coupler of layer 11 of Film A and 5.0 mg./sq. ft. of coupler XXVI, or 50 mg./sq. ft. of magenta coupler of layer 11 of Film C plus 5.0 mg./sq. ft. of coupler XXXVI. Color development of the coating results in gain in the contrast and density of the fine detail of subjects which enhances picture sharpness and overcomes losses often suffered as a result of light-scattering.

EXAMPLE 8

*Color Correction of Multilayer Packet Film Using DIR Couplers*

A film is constructed as described below, having the structure shown in FIGURE 10 of the drawings, wherein layer 10 is the support upon which is coated a blue-sensitive gelatino silver bromoiodide emulsion layer 11 containing a nondiffusing yellow image-forming coupler N-(p - benzoylacetamidobenzenesulfonyl) - N-(γ-phenylpropyl)-p-toluidine and packets of red- and green-sensitive emulsion, each containing a yellow dye-forming DIR coupler prepared as follows:

*Blue-Sensitive Emulsion (Layer 11)*

*Coupler dispersion.*—50 grams of coupler XXI (yellow dye-forming DIR coupler) are dissolved in warm (40° C.) ethyl acetate. This solution is mixed with 500 ml. of 10% phthaloylated gelatin, containing 30 ml. of 5% Alkanol B, all at 40° C., then dispersed by passing through a colloid mill. The dispersion is then set on a chill plate, noodled, and air-dried to constant weight.

*Coupler solvent dispersion.*—20 grams of 2,4-di-amylphenol are mixed with a solution of 75 ml. of 20% phthaloylated gelatin and 5 ml. of 10% Alkanol B at 40° C. The mixture is then dispersed in a colloid mill.

*Packet preparation (green-sensitive).*—1.45 grams of the dried coupler dispersion, containing 0.71 g. of coupler is soaked in 8 ml. of 2½% sodium citrate solution for about 30 minutes, then dispersed by heating to 40° C., and stirring. To this is added 17.5 grams of 20% phthaloylated gelatin and the mixture stirred for about 5 minutes. 2.8 ml. of 5% styrene-maleamic acid polymer solution is added, followed one minute later by 25.9 grams (0.01 M) of melted green-sensitized chlorobromide emulsion. The packets, which form during continued stirring at 40° C., are hardened after 10 minutes with 3 ml. of 10% calcium acetate solution. The system, which is now stabilized, can be set and held in the refrigerator until ready for coating.

Following the procedure of U.S. Patent 2,787,544, the 2,4-di-amylphenol dispersion is added, at the time of coating in an amount such that about twice the weight of the coupler XXXI is contained in the coating mixture.

*Packet preparation (red-sensitive).*—In a similar manner packets of red-sensitive emulsion are prepared also containing coupler XXXI.

The final emulsion for coating layer 11 is then prepared by adding the desired amount and proportions of the above green- and red-sensitive packets to a fast blue-sensitive gelatin silver bromo-iodide emulsion containing the yellow image-forming coupler mentioned. The amounts of the packets used are determined in part by the extent and type of color correction desired. The methods of Godowsky U.S. Patents 2,698,794 and 2,843,489 may also be used in preparing the polymeric packets.

*Red-sentitive emulsion (layer 12).*—In the manner described above, green-sensitive chlorobromide emulsion packets containing the cyan dye-forming DIR coupler XVI are prepared and added to a red-sensitive chlorobromide emulsion containing the nondiffusing cyan image coupler, 1 - hydroxy - N - [δ - (2,4 - di - tert - amyl-phenoxy)butyl]-2-naphthamide, and the emulsion coated as layer 12.

*Green-sensitive emulsion (layer 13).*—In the manner described above, packets of red-sensitive chlorobromide and blue-sensitive bromoiodide emulsion each containing the magenta dye-forming DIR coupler XXXVI are prepared and added in the quantity and proportion required to a green-sensitive chlorobromide emulsion containing the nondiffusing magenta dye-forming coupler 1-(2,4,6-trichlorophenyl) - 3 - {3 - [α - (2,4-di-tert-amylphenoxy) acetamido]benzamido}-5-pyrazolone and the resultant emulsion coated as layer 13 of the element of FIGURE 10.

The element prepared as described may be exposed in the usual way to a colored subject and developed with the color developer solution shown in Example 2 above. As a result, yellow, cyan and magenta dye images are obtained in layers 11, 12 and 13 respectively. The character of these dye images is determined by the amount of exposure of the sensitive packets present in each emulsion layer and the development-inhibiting substance formed. Thus, in layer 13 the DI substance formed from the DIR coupler in the red- and blue-sensitive packets decreases the amount of magenta dye image formed thus substracting green density and correcting for the unwanted green absorption of the yellow dye image in layer 11 and the green absorption of the cyan dye image in layer 12. Similar effects are obtained in layer 11 and 12, the development-inhibiting substances formed therein effecting corrections for the image dyes in the other layers.

It will be apparent from the above description that the DIR couplers such as coupler IV above react with oxidized silver halide developing agent to form nondiffusing dyes as well as splitting off the development-inhibiting substance from the DIR couplers. Consequently, the couplers may be chosen so that the dye obtained therefrom is identical to and supplements the dye obtained from the image-forming couplers of the system. Thus coupler IV forming a magenta dye can be used with a nondiffusing image-forming magenta coupler identical to IV except having no methoxyphenylazo substituent. Otherwise the coupler portion of the DIR coupler such as of coupler IX may form a soluble dye in the color development step, which dye washes from the emulsion layer. When the DIR couplers are used in an element such as shown in FIGURE 6, the color of the dye obtained from the DIR coupler is of no consequence so long as it is nondiffusing.

EXAMPLE 9

*Color Correction Using DIR Couplers*

A multilayer color film was prepared having the structure shown in FIGURE 11 of the accompanying drawings in the following manner: A support 10 was coated with a fogged silver bromoiodide emulsion layer 11 containing a mixture of the magenta dye-forming coupler 1-(2,4,6-trichlorophenyl) - 3 - {3-[α-(2,4-di-tert-amylphenoxy) acetamido]-benzamido}-5-pyrazolone and the yellow dye-forming coupler N - (p - benzoylacetamino benzenesulfonyl)-N-(γ-phenylpropyl)-p-toluidine. Over layer 11 was coated the emulsion layer 12 containing red-sensitive silver bromoiodide emulsion and the cyan dye-forming DIR coupler XXVI. Upon layer 12 was coated a barrier layer 13 composed of silver chloride in order to control the diffusion of the development-inhibiting substance formed in layer 12, followed by a fogged silver bromoiodide emulsion layer 14 containing a mixture of the colorless cyan and yellow dye-forming couplers such as 1 - hydroxy-N-[δ-(2,4-di-t-amylphenoxy)butyl]-2 - naphthamide and the yellow dye-forming coupler used in layer 11 followed by a green-sensitive silver bromoiodide emulsion layer 15 containing a magenta dye-forming DIR coupler such as compound XXXVI above. Upon layer 15 was coated a silver chloride barrier layer 16 containing a yellow filter material such as yellow colloidal silver followed by a fogged silver bromoiodide emulsion layer 17 containing a colorless magenta dye-forming coupler such as present in layer 11.

Upon layer 17 was coated a blue-sensitive silver bromoiodide emulsion layer 18 containing the yellow dye-forming DIR coupler XXXI.

Upon color development of the multilayer film described, negative dye images are formed in the emulsion layers 12, 15 and 18 and the development-inhibiting substance formed at the same time in the development of these layers diffuses to the underlying fogged silver halide emulsion layers and controls the development therein of masking images in the positive regions. Thus in the positive region of layer 11 a masking image composed of a mixture of magenta and yellow dyes is obtained, in the positive region of layer 14, a mixture of cyan and yellow dyes is obtained and in the positive region of layer 17, a masking image composed of magenta dye is obtained. As a result, the positive masking images obtained in layers 11, 14 and 17 serve to impart full color correction to the negative images in emulsion layers 12, 15 and 18.

It will be noted that the film prepared as described and shown in FIGURE 11 of the drawings contains substantially colorless couplers which is advantageous since conventional colored couplers tend to interfere with the exposure of such films. In preparing a film of the structure described, it may be desirable for some purposes to supplement the cyan, magenta and yellow dye-forming DIR couplers in layers 12, 15 and 18 by conventional nondiffusing cyan, magenta and yellow dye-forming couplers. As a result, the dye images formed in layers 12, 15 and 18 will be composed of a mixture of dyes. Thus, in emulsion layer 12 would be formed a cyan negative dye image composed of cyan dyes formed from both the cyan DIR coupler and the supplementary nondiffusing cyan coupler.

A wide variety of photographic emulsions may be used in the sensitive elements of the invention containing contiguous DIR couplers, such as gelatino silver bromide and bromoiodide emulsions. In some sensitive elements, such as shown in FIGURE 6, different species of silver halide are used such that the negative emulsion has a shorter development induction period than the other emulsion in order to assure the formation of the development-inhibiting substance prior to the time that development of the other emulsion commences.

The emulsion addenda described in Whitmore et al. U.S. patent application Serial No. 734,141, filed May 9, 1958, including the noble metal salts, stannous salts, polyamines, optical sensitizing dyes, stabilizing compounds, speed increasing compounds, plasticizers, gelatin hardeners, coating aids and colloid vehicles disclosed therein may be used advantageously in the present emulsions.

The Whitmore et al. U.S. patent application Serial No. 734,141, filed May 9, 1958, at pages 63 to 65, discloses the direct positive process described above utilizing the development inhibitor releasing coupler XLII above and other tdevelopment inhibitor releasing couplers for locally inhibiting the development of adjacent fogged emulsion layers as claimed herein.

What we claim is:

1. The process for controlling the development of a photographic image which comprises developing with an aromatic primary amino silver halide color developing agent an exposed light-sensitive photographic element comprising at least one silver halide emulsion layer in the presence of a development inhibitor-releasing coupler having the formula R—Cp wherein (1) R is selected from the group consisting of 2-aminoarylazo, 2-amidoarylazo, 2-aminoarylazoxy and 2-amidorarylazoxy radicals,
(2) Cp is a photographic color coupler having substituted in its coupling position the said R substituent, said development inhibitor-releasing coupler reacting with resulting oxidized color developing agent at the coupling position of said Cp substituent to release said R substituent that intrareacts to form a diffusible aryltriazole that inhibits development of silver halide in said element.

2. The process for controlling the development of a photographic image which comprises developing with an aromatic primary amino silver halide color developing an exposed light-sensitive photographic element comprising at least one silver halide emulsion layer having contiguous to the silver halide of at least one of said silver halide emulsion layers a nondiffusing development inhibitor-releasing coupler having the formula R—Cp wherein (1) R is a 2-aminophenylazo radical, and
(2) Cp is a photographic color coupler having substituted in its coupling position the said R substituent, said development inhibitor-releasing coupler reacting with resulting oxidized color developing agent at the coupling position of said Cp substituent to release said R substituent that intrareacts to form a diffusible phenyltriazole that inhibits development of silver halide in said element.

3. The process for controlling the development of a photographic image which comprises developing with an aromatic primary amino silver halide color developing agent an exposed light-sensitive photographic element comprising at least one silver halide emulsion layer having contiguous to the silver halide of at least one of said silver halide emulsion layers a nondiffusing development inhibitor-releasing coupler having the formula R—Cp wherein (1) R is a 2-amidophenylazo radical, and
(2) Cp is a photographic color coupler having substituted in its coupling position the said R substituent, said development inhibitor-releasing coupler reacting with resulting oxidized color developing agent at the coupling position of said Cp substituent to release said R substituent that intrareacts to form a diffusible phenyltriazole that inhibits development of silver halide in said element.

4. The process for controlling the development of a photographic image which comprises developing with an aromatic primary amino silver halide color developing agent an exposed light-sensitive photographic element comprising at least one silver halide emulsion layer having contiguous to the silver halide of at least one of said silver halide emulsion layers a nondiffusing development inhibitor-releasing coupler having the formula R—Cp wherein (1) R is a 2-aminophenylazoxy radical, and
(2) Cp is a photographic color coupler having substituted in its coupling position the said R substituent, said development inhibitor-releasing coupler reacting with resulting oxidized color developing agent at the coupling position of said Cp substituent to release said R substituent that intrareacts to form a diffusible phenyltriazole that inhibits development of silver halide in said element.

5. The process for controlling the development of a photographic image which comprises developing with an aromatic primary amino silver halide color developing agent an exposed light-sensitive photographic element comprising at least one silver halide emulsion layer having contiguous to the silver halide of at least one of said silver halide emulsion layers a nondiffusing development inhibitor-releasing coupler having the formula R—Cp wherein (1) R is a 2-amidophenylazoxy radical, and
(2) Cp is a photographic color coupler having substituted in its coupling position the said R substituent, said development inhibitor-releasing coupler reacting with resulting oxidized color developing agent at the coupling position of said Cp substituent to release said R substituent that intrareacts to form a diffusible phenyltriazole that inhibits development of silver halide in said element.

6. The process for controlling the development of a photographic image which comprises developing with an aromatic primary amino silver halide color developing agent and exposed light-sensitive photographic element comprising at least one silver halide emulsion layer having contiguous to the silver halide of at least one of said silver halide emulsion layers a nondiffusing development inhibitor-releasing coupler, said development inhibitor-releasing coupler reacting with resulting oxidized color developing agent to release a diffusible phenyltriazole that inhibits development of silver halide in said element and being selected from the group consisting of (1) 1-hydroxy-4-(2-amino-4-methylphenylazo)-N-[δ-(2,4-di-tert-amylphenoxy)butyl]-2-naphthamide,
(2) 1-hydroxy-4-(2-acetamidophenylazo)-N-[δ-2,4-di-tert-amylphenoxy)butyl]-2-naphthamide,
(3) 1-hydroxy-4-(2-aminophenylazo)-N-[δ-(2,4-di-tert-amylphenoxy)butyl]-2-naphthamide,
(4) 1-[4-(4-tert-butyphenoxy)phenyl]-3-[α-4-tert-butylphenoxy)propionamido]-4-4-(2-amino-4-methoxyphenylazo)-5-pyrazolone,
(5) 1-(2,4,6-trichlorophenyl)-3-{3-[α-(2,4-di-tert-amylphenoxy)acetamido]-benzamido}-4-(2-amino-4-methoxyphenylazo)-5-pyrazolone,
(6) 1-hydroxy-4-(2-amino-4-chlorophenylazo)-N-[δ (2,4-di-tert-amylphenoxy)butyl]-2-naphthamide, (7) α-benzoyl-α-(2-aminophenylazo)-4-[N-(p-tolyl)-N-(γ-phenylpropyl)sulfamyl]acetanilide,
(8) 1-hydroxy-4-(2-palmitamidophenylazo)-N-[δ-(2,4-di-tert-amylphenoxy)butyl]-2-naphthamide,
(9) 1,hydroxy-4-(2-acetamidophenylazo)-N-octadecyl-3′,5′-dicarboxy-2-naphthanilide,
(10) 1-hydroxy-4-(4-methoxy-2-palmitamidophenylazo)-N-(β-sulfoethyl)-2-naphthamide sodium salt,
(11) 1-hydroxy-4-[2-(β-sulfopropionamido)phenylazo]-N-ethyl-2-naphthamide sodium salt,
(12) 1-hydroxy-4-(2-acetamido-4-methoxy)-N-(β-sulfoethyl)-2-naphthamide sodium salt,
(13) 1-hydroxy-4-(2-aminophenylazo)-N-(β-sulfoethyl)-2-naphthamide sodium salt,
(14) 1-hydroxy-4-(2-amino-4-methoxyphenylazo)-N-(β-sulfoethyl)-2-naphthamide sodium salt,
(15) 1-hydroxy-4-(2-amino-4-methylphenylazoxy)-N-[δ-(2,4-di-tert-amylphenoxy)butyl]-2-naphthamide, and
(16) 1-hydroxy-4-(2-aminophenylazoxy)-N-[δ-(2,4-di-tert-amylphenoxy)butyl]-2-naphthamide.

7. The process as described in claim 1 wherein at least one silver halide emulsion layer contains a nondiffusing image-forming photographic color coupler in addition to any development inhibitor-releasing coupler, and the color developer reacts with said image-forming coupler to form a dye.

8. The process as described in claim 1 wherein the development inhibitor-releasing coupler is nondiffusing, integral with the photographic element and contiguous to the silver halide of at least one silver halide emulsion layer.

9. The process as described in claim 1 wherein the development inhibitor-releasing coupler and the color developing agent are dissolved in an aqueous alkaline solution and the development is effected by imbibing the photographic element with said aqueous alkaline solution.

10. A light-sensitive photographic element comprising at least one silver halide emulsion layer having contiguous to the silver halide a nondiffusing development inhibitor-releasing coupler capable of releasing a diffusible aryltriazole silver halide development inhibitor on reaction with oxidized aromatic primary amino silver halide color developing agent and having the formula R—Cp wherein
(1) R is selected from the group consisting of 2-aminoarylazo, 2-amidoarylazo, 2-aminoarylazoxy and 2-amidoarylazoxy radicals, and
(2) Cp is a photographic color coupler having substituted in its coupling position the said R substituent.

11. A light-sensitive photographic element comprising at least one silver halide emulsion layer having contiguous to the silver halide of at least one of said silver halide emulsion layers a nondiffusing development inhibitor-releasing coupler capable of releasing a diffusible phenyltriazole silver halide development inhibitor on reaction with oxidized aromatic primary amino silver halide color developing agent and having the formula R—Cp wherein
(1) R is a 2-aminophenylazo radical, and
(2) Cp is a photographic color coupler having substituted in its coupling position the said R substituent.

12. A light-sensitive photographic element comprising at least one silver halide emulsion layer having contiguous to the silver halide of at least one of said silver halide emulsion layers a nondiffusing development inhibitor-releasing coupler capable of releasing a diffusible phenyltriazole silver halide development inhibitor on reaction with oxidized aromatic primary amino silver halide color developing agent and having the formula R—Cp wherein
(1) R is a 2-amidophenylazo radical, and
(2) Cp is a photographic color coupler having substituted in its coupling position the said R substituent.

13. A light-sensitive photographic element comprising at least one silver halide emulsion layer having contiguous to the silver halide of at least one of said silver halide emulsion layers a nondiffusing development inhibitor-releasing coupler capable of releasing a diffusible phenyltriazole silver halide development inhibitor on reaction with oxidized aromatic primary amino silver halide color developing agent and having the formula R—Cp wherein
(1) R is a 2-aminophenylazoxy radical, and
(2) Cp is a photographic color coupler having substituted in its coupling position the said R substituent.

14. A light-sensitive photographic element comprising at least one silver halide emulsion layer having contiguous to the silver halide of at least one of said silver halide emulsion layers a nondiffusing development inhibitor-releasing coupler capable of releasing a diffusible phenyltriazole silver halide development inhibitor on reaction with oxidized aromatic primary amino silver halide color developing agent and having the formula R—Cp wherein
(1) R is a 2-amidophenylazoxy radical, and
(2) Cp is a photographic color coupler having substituted in its coupling position the said R substituent.

15. A light-sensitive photographic element comprising at least one silver halide emulsion layer having contiguous to the silver halide of at least one of said silver halide emulsion layers a nondiffusing development inhibitor-releasing coupler capable of releasing a diffusible phenyltriazole silver halide development inhibitor on reaction with oxidized aromatic primary amino silver halide color developing agent and being selected from the group consisting of
(1) 1-hydroxy-4-(2-amino-4-methylphenylazo)-N-[δ-(2,4-di-tert-amylphenoxy)butyl]-2-naphthamide,
(2) 1-hydroxy-4-(2-acetamidophenylazo)-N-[δ-(2,4-di-tert-amylphenoxy)butyl]-2-naphthamide,
(3) 1-hydroxy-4-(2-aminophenylazo)-N-[δ-(2,4-di-tert-amylphenoxy)butyl]-2-naphthamide,
(4) 1-[4-(4-tert-butylphenoxy)phenyl]-3-[α(4-tert-butylphenoxy)-propionamido]-4-(2-amino-4-methoxyphenylazo)-5-pyrazolone,
(5) 1-(2,4,6-trichlorophenyl)-3-{3-[α-(2,4-di-tert-amylphenoxy)acetamido]-benzamido}-4-(2-amino-4-methoxyphenylazo)-5-pyrazolone,
(6) 1-hydroxy-4-(2-amino-4-chlorophenylazo)-N-[δ-(2,4-di-tert-amylphenoxy)butyl]-2-naphthamide,
(7) α-benzoyl-α-(2-aminophenylazo)-4-[N-(p-tolyl)-N-(γ-phenylpropyl)sulfamyl]acetanilide,
(8) 1-hydroxy-4-(2-palmitamidophenylazo)-N-[δ-(2,4-di-tert-amylphenoxy)butyl]-2-naphthamide,
(9) 1-hydroxy-4-(2-acetamidophenylazo)-N-octadecyl-3′,5′-dicarboxy-2-naphthanilide,
(10) 1-hydroxy-4-(4-methoxy-2-palmitamidophenylazo)-N-(β-sulfoethyl)-2-naphthamide sodium salt,
(11) 1-hydroxy-4-[2-(β-sulfopropionamido)phenylazo]-N-ethyl-2-naphthamide sodium salt,
(12) 1-hydroxy-4-(2-acetamido-4-methoxy)-N-(β-sulfoethyl)-2-naphthamide sodium salt,
(13) 1-hydroxy-4-(2-aminophenylazo)-N-(β-sulfoethyl)-2-naphthamide sodium salt,
(14) 1-hydroxy-4-(2-amino-4-methoxyphenylazo)-N-(β-sulfoethyl)-2-naphthamide sodium salt,
(15) 1-hydroxy-4-(2-amino-4-methylphenylazoxy)-N-[δ-(2,4-di-tert-amylphenoxy)butyl]-2-naphthamide, and
(16) 1-hydroxy-4-(2-aminophenylazoxy)-N-[δ-(2,4-di-tert-amylphenoxy)butyl]-2-naphthamide.

16. A light-sensitive photographic element as described in claim 10 containing a nondiffusing image-forming photographic color coupler in addition to the development inhibitor-releasing coupler that forms a dye on reaction with oxidized aromatic primary amino silver halide color developing agent.

References Cited in the file of this patent

UNITED STATES PATENTS

| | | |
|---|---|---|
| 2,292,306 | Vittum et al. | Aug. 4, 1942 |
| 2,453,661 | Glass | Nov. 9, 1948 |
| 2,455,169 | Glass | Nov. 30, 1948 |
| 2,455,170 | Glass et al. | Nov. 30, 1948 |
| 2,614,925 | Carroll et al. | Oct. 21, 1952 |
| 2,688,539 | Heimbach et al. | Sept. 7, 1954 |
| 2,694,008 | Berger et al. | Nov. 9, 1954 |
| 2,706,683 | Sawdey | Apr. 18, 1955 |
| 2,706,684 | Graham | Apr. 19, 1955 |
| 2,710,802 | Parmerter | June 14, 1955 |
| 2,712,995 | Weyde | July 12, 1955 |
| 2,808,329 | Whitmore | Oct. 1, 1957 |
| 2,852,370 | Whitmore | Sept. 16, 1958 |
| 3,005,712 | Saunders | Oct. 24, 1961 |
| 3,006,759 | Loria et al. | Oct. 31, 1961 |

OTHER REFERENCES

Ilford Manual of Photography (Horder, Editor), May 1958, pages 402, 403.

Glafkides: Photographic Chemistry, vol. 1, Fountain Press, 1958, pages 374–380.

UNITED STATES PATENT OFFICE
CERTIFICATE OF CORRECTION

Patent No. 3,148,062                 September 8, 1964

Keith E. Whitmore et al.

It is hereby certified that error appears in the above numbered patent requiring correction and that the said Letters Patent should read as corrected below.

Column 33, line 48, after "developing" insert -- agent --; column 34, line 69, for "-4-4-" read -- -4- --.

Signed and sealed this 20th day of April 1965.

(SEAL)
Attest:

ERNEST W. SWIDER  
Attesting Officer

EDWARD J. BRENNER  
Commissioner of Patents